United States Patent
Laurenson et al.

(10) Patent No.: US 8,399,049 B2
(45) Date of Patent: Mar. 19, 2013

(54) PROCESS FOR PREPARING AND CROSSLINKING A CABLE COMPRISING A POLYMER COMPOSITION AND A CROSSLINKED CABLE

(75) Inventors: Paul Laurenson, Tence (FR); Detlef Wald, Villmergen (CH); Erik Perzon, Goteborg (SE); John Jamieson, Goteborg (SE); Siegfried Wegener, Dusseldorf (DE); Rudi Peters, Mol (BE); Annika Smedberg, Myggenas (SE); Lieve Michiels, Bierbeek (BE); Jan-Ove Bosstrom, Odsmal (SE)

(73) Assignee: Borealis Technology Oy, Ponvoo (FI)

( * ) Notice: Subject to any disclaimer, the term of this patent is extended or adjusted under 35 U.S.C. 154(b) by 498 days.

(21) Appl. No.: 12/667,552

(22) PCT Filed: Jul. 10, 2008

(86) PCT No.: PCT/EP2008/005642
§ 371 (c)(1),
(2), (4) Date: Feb. 26, 2010

(87) PCT Pub. No.: WO2009/007119
PCT Pub. Date: Jan. 15, 2009

(65) Prior Publication Data
US 2010/0193217 A1    Aug. 5, 2010

(30) Foreign Application Priority Data
Jul. 12, 2007    (EP) ..................................... 07112307

(51) Int. Cl.
*B05D 5/12* (2006.01)
*H01B 7/00* (2006.01)

(52) U.S. Cl. ...... 427/117; 427/118; 427/120; 427/374.4

(58) Field of Classification Search .................. 427/117, 427/118, 120, 374.1; 174/120 SR
See application file for complete search history.

(56) References Cited

U.S. PATENT DOCUMENTS

| | | | |
|---|---|---|---|
| 3,725,230 A | | 4/1973 | Bander et al. |
| 6,231,978 B1 * | | 5/2001 | Keogh .......................... 428/378 |
| 2002/0169238 A1 * | | 11/2002 | Caronia et al. ................ 524/100 |
| 2006/0182880 A1 | | 8/2006 | Gitschner |
| 2007/0181333 A1 | | 8/2007 | Belli et al. |
| 2008/0254289 A1 | | 10/2008 | Bostrom et al. |

FOREIGN PATENT DOCUMENTS

| | | | |
|---|---|---|---|
| EP | 0579434 | * | 1/1994 |
| EP | 1695996 | * | 8/2006 |
| GB | 1380942 | * | 1/1975 |
| GB | 1592958 | * | 7/1981 |
| WO | 2005/015576 | | 2/2005 |
| WO | 2009/007116 A1 | | 1/2009 |
| WO | 2009/007117 A1 | | 1/2009 |
| WO | 2009/007118 A1 | | 1/2009 |

* cited by examiner

*Primary Examiner* — Brian K Talbot
(74) *Attorney, Agent, or Firm* — Sutherland Asbill & Brennan LLP

(57) ABSTRACT

The application relates to a process for preparing a crosslinked cable, including:—applying one or more layers including a polymer composition on a conductor, wherein at least one layer includes one or more free radical generating agents,—crosslinking by radical reaction said at least one layer comprising said free radical generating agent(s),—cooling the obtained crosslinked cable in pressurized conditions.

24 Claims, No Drawings

PROCESS FOR PREPARING AND CROSSLINKING A CABLE COMPRISING A POLYMER COMPOSITION AND A CROSSLINKED CABLE

FIELD OF INVENTION

The invention relates to a process for preparing a cable or wire using a radical generating agent, as well as to a crosslinked cable or wire. The invention also relates to a polymer composition usable in a cable layer, to preparation process thereof and to free radical generating agents for crosslinking by radical reaction.

BACKGROUND ART

It is known to use free radical generating agents for modifying a product, such as a polymer composition via a radical reaction.

Free radical agents are used e.g. to initiate (a) crosslinking in a polymer, i.a. primarily formation of interpolymer crosslinks (bridges) by radical reaction, (b) grafting in a polymer, i.e. introduction of compounds to a polymer chain (to backbone and/or side chains) by radical reaction, and (c) visbreaking in a polymer, i.e. modification of melt flow rate (MFR) of a polymer by radical reaction. These polymer modifications are well known in the art.

When added to a polymer composition, free radical generating agents act by generating radicals, typically by decomposing to radicals, under conditions which enable the radical formation. The decomposed radicals initiate further radical reactions within a polymer composition. The resulting decomposition products of the free radical generating agent are typically a result of several reactions of the decomposition products of initial radical forming reaction. Said resulting decomposition products typically remain in the modified polymer and may include detrimental, undesired decomposition products.

Peroxides are very common free radical generating agents used i.a. in the polymer industry for said polymer modifications. The resulting decomposition products of peroxides may include volatile by-products. For example, dicumylperoxide, which is commonly used peroxide in polymer field, decomposes i.a. to methane, acetophenone and cumylalcohol during the radical formation step, e.g. during a crosslinking step. The formed gaseous methane ($CH_4$) is flammable, explosive and volatile and thus a risk in a working environment.

In wire and cable applications, a typical cable comprises at least one conductor surrounded by one or more layers of polymeric materials. In some power cables, including medium voltage (MV), high voltage (HV) and extra high voltage (EHV) cables, said conductor is surrounded by several layers including an inner semiconductive layer, an insulation layer and an outer semiconductive layer, in that order. The cables are commonly produced by extruding the layers on a conductor. One or more of said layers are then typically crosslinked to improve i.a. deformation resistance at elevated temperatures, as well as mechanical strength and/or chemical resistance, of the layer(s) of the cable. The free radical generating agent, such as peroxide, is typically incorporated into the layer material prior to the extrusion of the layer(s) on a conductor. After formation of the layered cable, the cable is then subjected to a crosslinking step to initiate the radical formation and thereby crosslinking reaction.

The decomposition products of the free radical forming agent remain mostly captured within the cable layer after crosslinking. This causes problems in view of the cable manufacturing process as well as in view of the quality of the final cable.

Accordingly, after crosslinking the cable must be cooled with great care to prevent the gaseous volatile decomposition products like methane forming voids within the polymer layer. These voids have typically an average diameter of between 10 to 100 Partial discharges can take place in such voids within a cable that is subjected to an electrical field and thereby reduce the electrical strength of the cable.

The MV, HV and EHV power cables must have high layer quality in terms of safety during installation and in end use thereof. In service, volatile decomposition products in a cable resulting from a crosslinking step can create a gas pressure and thus cause defects in the shielding and in the joints. E.g. when a cable is equipped with a metal barrier, then the gaseous products can exert a pressure, especially on the joints and terminations, whereby a system failure may occur.

For the above reasons the volatile decomposition products, such as methane e.g. where dicumylperoxide is used, are conventionally reduced to a minimum or removed after crosslinking and cooling step. Such a removal step is generally known as a degassing step.

The degassing step is time and energy consuming and is thus a costly operation in a cable manufacturing process. Degassing requires large heated chambers which must be well ventilated to avoid the build-up of e.g. flammable methane and ethane. The cable, typically wound to cable drums, is normally degassed at elevated temperature in the range of 50-80° C., e.g. 60-70° C., for lengthy time periods. At these temperatures however, thermal expansion and softening of the insulation can occur and lead to undue deformation of the formed cable layers resulting directly in failures of the cable. The degassing of MV, HV and EHV cables with high cable weight needs thus often be carried out at decreased temperatures.

Accordingly, there is a need to find new solutions to overcome the prior art problems.

OBJECTS OF THE INVENTION

An object of the invention is to provide a process for producing and a process for crosslinking a cable, which process enables the preparation of high quality products with shorter production time and/or lower energy consumption.

Another object of the invention is to provide a crosslinked cable which comprises one or more layers comprising a crosslinked polymer composition, which cable has highly advantageous properties, such as a high quality and superior proccessability properties.

The invention and further objects thereof are described and defined in details below.

DESCRIPTION OF THE INVENTION

As to the first object, the invention is directed to a process for preparing a crosslinked cable, comprising i.a. the steps of:
applying one or more layers comprising a polymer composition on a conductor, wherein at least one layer comprises one or more free radical generating agents,
crosslinking by radical reaction said at least one layer comprising said free radical generating agent(s),
cooling the obtained crosslinked cable under pressurized conditions to a cooled temperature, and
recovering the crosslinked and cooled cable in a conventional manner for further use;

characterized in that said process comprises one or more of the following features:

(i) said crosslinked and cooled cable is removed from the pressurized cooling step at a cooled temperature which is higher than the cooled temperature required for a reference cable which is a crosslinked cable having the same structure and layer material in each of said one or more layers, and prepared using the same process and conditions, and the same degree of crosslinking, as the claimed cable, but using a dicumyl peroxide as the free radical generating agent, in order for said reference cable to obtain the same level of voids at the exit of the pressurized cooling step as said claimed cable, which voids are formed by volatile decomposition products of said crosslinking step, or (ii) said crosslinking and pressurized cooling step is carried out at a lower pressure than the pressure required for a reference cable which is a crosslinked cable having the same structure and layer material in each of said one or more layers, and prepared using the same process and conditions, and the same degree of crosslinking, as the claimed cable, but using a dicumyl peroxide as the free radical generating agent, in order for said reference cable to obtain the same level of voids at the exit of the pressurized cooling step as said claimed cable, which voids are formed by volatile decomposition products of said crosslinking step.

Said crosslinked cable which is crosslinked using dicumyl peroxide and used above and in claim 1 for the comparison of said cooled cable is abbreviated herein as "crosslinked reference cable"

The term "volatile decomposition products of said crosslinking step" are decomposition products formed during the crosslinking step, and possibly still during said pressurized cooling step, by initiation of the free radical generating agent as further defined and explained below. E.g. methane and/or ethane can be such volatiles. The "cooled temperature" is a temperature of the crosslinked cable, such as the temperature at the conductor of said cable wherein said cable leaves the pressurized cooling zone. The "degree of crosslinking" can be measured using any known crosslinking determination, for example using well known so called hot set or gel content determination.

The level of voids can be determined using any suitable method or property that is directly or indirectly indicative of the presence and level of said voids. Thus the determination method is not critical provided that the crosslinked cable of the invention and the crosslinked reference cable are determined for the same property using the same determination method, protocol and instrumentation. As an example, microscopic analysis of the number and size of voids or partial discharge measurement can be mentioned.

Preferably, in said process of the invention the crosslinked cable can be removed from said pressurized cooling step at a cooled temperature of 2° C. or more, more preferably at a cooled temperature of 5° C. or more, higher than the cooled temperature of said crosslinked reference cable as defined above and in claim 1, when measured from a conductor of a crosslinked cable at the exit of the pressurized cooling step.

In some embodiments of the process of the invention, the cooled temperature of a conductor of the crosslinked cable of the invention may even be of 8° C. or more, or even of 10° C. or more, or even of 20° C. or more, higher than that of said crosslinked reference cable when measured as defined above. The upper limit for said temperature difference is not critical and the only limitation for the exit temperature on the conductor is that it must be below the melting point of the layer material. The cooling can be continued in non-pressurized conditions, if desired.

In a further embodiment, it has been found that by using the free radical generating agents of the invention, the crosslinking step and/or the cooling step can be effected at ambient pressure, i.e. without pressurisation.

Viewed from another aspect the invention provides a process for preparing a crosslinked cable, comprising the steps of:

(i) applying one or more layers comprising a polymer composition on a conductor, wherein at least one layer comprises one or more free radical generating agents, (ii) crosslinking by radical reaction said at least one layer comprising said free radical generating agent(s), preferably under ambient pressure, (iii) cooling the obtained crosslinked cable, preferably under ambient pressure, and (iv) reducing or removing the content of volatile decomposition products(s), at ambient or in elevated temperature, from said crosslinked cable obtained from said cooling step; wherein said one or more free radical generating agents is a compound of formula (I) as herein described.

In a further embodiment, the use of the free radical generating agent of the invention allows the elimination of step (iv) of the above processes as it eliminates the formation of volatile decomposition products. This forms a further aspect of the invention (i.e. where any process above is carried out without step (iv)). In particular the invention provides a process for preparing a crosslinked cable, comprising the steps of:

(i) applying one or more layers comprising a polymer composition on a conductor, wherein at least one layer comprises one or more free radical generating agents, (ii) crosslinking by radical reaction said at least one layer comprising said free radical generating agent(s), preferably under ambient pressure, (iii) cooling the obtained crosslinked cable, preferably under ambient pressure, and (iv) using the product of step (iii) as a cable (i.e. no degassing step takes place);

wherein said one or more free radical generating agents is a compound of formula (I) as herein described.

The preferable conditions of the cooling step, such as cooling pressure and/or cooling temperatures, of the process of the invention, as well as other features of the invention and preferable embodiments, variants and subgroups thereof are further specified below.

Viewed from another aspect the invention provides a process for preparing a crosslinked cable, comprising the steps of:

applying one or more layers comprising a polymer composition on a conductor, wherein at least one layer comprises one or more free radical generating agents, crosslinking by radical reaction said at least one layer comprising said free radical generating agent(s), cooling the obtained crosslinked cable under pressurized conditions to a cooled temperature, and recovering the crosslinked and cooled cable in a conventional manner for further use wherein said one or more free radical generating agents is a compound of formula (I) as defined below.

COMPOUNDS OF THE INVENTION

Accordingly, in a first embodiment, the invention provides a compound for use as a free radical generating agent which compound results in methane ($CH_4$) content of less than 300 ppm (weight), preferably of less than 200 ppm (weight), preferably of less than 100 ppm (weight) more preferably of 0 to 50 ppm (weight), as a decomposition product thereof.

Generally, in above and below definitions the given values in ppm for methane and/or other volatile content are determined by gas chromatography from the obtained crosslinked polymer composition as such or from a crosslinked cable layer, depending on the definition, according to a method as described below under "GC-analysis protocol". Accordingly, the produced methane or other volatile content can equally be determined from a crosslinked polymer composition as such or from a crosslinked manufactured article thereof, as desired, each consisting of the polymer composition of the invention. The sample under the test is crosslinked using the test free radical generating agent in such an amount which results in a crosslinking degree expressed as gel content of 50%, and preferably gel content of at least 50%. The gel content (%) is measured according to ASTM D2765-01 Method A or B (depending on the nature of the sample). Such a crosslinked sample is then used for preparing the sample for volatile content measurement of GC-analysis protocol.

Without limiting to any theory, the terms "a decomposition product(s) thereof" or "a decomposition product of a free radical generating step" etc. as used above and below mean herein a by-product(s) formed during a free radical generating step, e.g. crosslinking step, and possibly also during the cooling step, by initiation of the free radical generating agent, as well known in the art. As an example methane may be one decomposition product which is an undesired decomposition product of the invention. Further decomposition products are specified below, which may not be desired in various embodiments of the invention.

Alternatively, the compound of the invention can also be defined as a compound for use as a free radical generating agent which in said use results in $CH_4$ content of less than 300 ppm (weight), preferably of less than 200 ppm (weight), preferably of less than 100 ppm (weight), more preferably of 0 to 50 ppm (weight), even more preferably is without resulting in $CH_4$, as a decomposition product thereof.

The invention, in a second embodiment, is also directed independently to a compound for use as a free radical generating agent which compound is without $CH_4$ as a decomposition product thereof. The absence of methane can be determined according to a method described below under "GC-analysis protocol".

Said first and second groups of the compound of the invention are unitary and all alternatives define the principal of the present invention in terms of residues originating from a free radical generating agent.

The term "without resulting in $CH_4$ as a decomposition product thereof" means that a compound of the present invention generates no methane, or in alternative terms does not decompose to the undesired volatile $CH_4$ by-product during a radical formation step in an industrial process.

The solution of the invention provides a new principal which is surprising and unobvious, since in the prior art there is no teaching or any indication to modify the free radical generating agent in order to avoid formation of $CH_4$ as a decomposing product during the free radical formation step in an industrial process. For example, in crosslinking applications, the prior art has proposed merely solutions relating to balance the amount of free radical generating agent and the needed degree of crosslinking.

Thus the invention further provides an industrial process, which comprises a step of forming free radicals using a free radical generating agent suitable for modifying a product via radical reaction, wherein a free radical generating compound is used which results in $CH_4$ content of less than 300 ppm (weight), preferably of less than 200 ppm (weight), preferably of less than 100 ppm (weight), more preferably of 0 to 50 ppm (weight), even more preferably is without resulting to $CH_4$, as a decomposition product thereof.

In one embodiment said compound of the invention results in reduced amount of or preferably does not decompose to low molecular weight compounds selected from (C1-C3)alkanes when generating free radicals, e.g. in industrial applications.

In another embodiment of the invention it is advantageous that said compound as a free radical generating agent results in reduced amount of or preferably is without (C1-C4)alkanes as decomposition products thereof when generating free radicals, e.g. in industrial applications.

In embodiments, wherein very high quality is required for the products modified by using a free radical agent, then it is preferable that said compound results in reduced amount of or is preferably without (C1-C6)alkanes as decomposition products thereof during a free radical forming step, e.g. in an industrial process.

The term "a free radical generating agent" is defined herein above or below to be any compound capable of generating radicals, e.g. in industrial applications, e.g. which can initiate a modification reaction in a polymer, such as a crosslinking, grafting or visbreaking reaction in a polymer.

As a further independent invention, the invention is directed to a compound for use as a free radical generating agent which bears one or more moieties in its structure which are decomposable to a decomposition product in a free radical generating step, characterized in that said compound is selected from one or more of:

a compound, wherein said one or more decomposable moieties result in a $CH_4$ content of less than 300 ppm (weight), preferably of less than 200 ppm (weight), preferably of less than 100 ppm (weight), more preferably of up to 50 ppm (weight) as said decomposition product; or a compound without any such moiety that is decomposable to $CH_4$ as said decomposition product; or any mixture thereof.

Preferably, said compound of the invention contains at least one —O—O— bond or at least one —N=N— bond. More preferably, said compound of the invention is a peroxide, preferably an organic peroxide compound.

The compounds of the invention as defined above by a feature of the decomposition product thereof form an independent first and second groups of the compounds of invention.

A third independent invention is directed to a compound for use as a free radical generating agent which does not result in (i.e. is without) decomposition products, preferably hydrocarbon decomposition products, having a boiling point at atmospheric pressure of less than 50° C., preferably less than 80° C., or in some embodiments even less than 100° C. may be desired. "Hydrocarbon" has the same meaning as given below for "hydrocarbyl" which represents a hydrocarbon as a monovalent substituent. Preferably, this $3^{rd}$ group of compounds of the invention and the above first and second groups of compounds of invention can be dependent on each other, in any order.

The invention is further independently directed to a compound for use as a free radical generating agent which is an organic peroxide of formula (I)

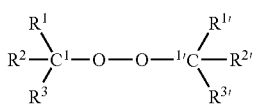

(I)

wherein
R$^1$ and R$^{1'}$ are each independently H, substituted or unsubstituted saturated or partially unsaturated hydrocarbyl or substituted or unsubstituted aromatic hydrocarbyl;
  wherein each of said substituted or unsubstituted saturated or partially unsaturated hydrocarbyl or aromatic hydrocarbyl optionally comprises one or more heteroatoms;
  wherein said substituted or unsubstituted saturated or partially unsaturated hydrocarbyl include, preferably is selected from, (i) straight or branched chain saturated or partially unsaturated hydrocarbyls, (ii) straight or branched chain saturated or partially unsaturated hydrocarbyls which bear saturated or partially unsaturated cyclic hydrocarbyl and (iii) saturated or partially unsaturated cyclic hydrocarbyls;
  wherein each of said aromatic hydrocarbyl and said saturated or partially unsaturated cyclic hydrocarbyl is independently a monocyclic or multicyclic ring system; and
  wherein said substituted saturated or partially unsaturated hydrocarbyl or substituted aromatic hydrocarbyl comprise independently 1 to 4 substituents selected from a functional group, a saturated or partially unsaturated hydrocarbyl optionally bearing a functional group or aromatic hydrocarbyl optionally bearing a functional group;
R$^2$, R$^{2'}$, R$^3$ and R$^{3'}$ are each independently H, substituted or unsubstituted saturated or partially unsaturated hydrocarbyl or substituted or unsubstituted aromatic hydrocarbyl;
  wherein each of said substituted or unsubstituted saturated or partially unsaturated hydrocarbyl or aromatic hydrocarbyl optionally comprises one or more heteroatoms;
  wherein said substituted or unsubstituted saturated or partially unsaturated hydrocarbyl include (i) straight or branched chain saturated or partially unsaturated hydrocarbyls, (ii) straight or branched chain saturated or partially unsaturated hydrocarbyls which bear saturated or partially unsaturated cyclic hydrocarbyl and (iii) saturated or partially unsaturated cyclic hydrocarbyls;
  wherein each of said aromatic hydrocarbyl and said saturated or partially unsaturated cyclic hydrocarbyl is independently a monocyclic or multicyclic ring system; and
  wherein said substituted saturated or partially unsaturated hydrocarbyl or substituted aromatic hydrocarbyl comprise independently 1 to 4 substituents selected from a functional group or a saturated or partially unsaturated hydrocarbyl optionally bearing a functional group or aromatic hydrocarbyl optionally bearing a functional group; or
R$^2$ and R$^3$ together with the carbon atom (C$^1$) to which they are attached form an unsubstituted or substituted saturated or partially unsaturated carbocyclic ring moiety of 3 to 14 C-atoms, preferably 5-12 C atoms; an unsubstituted or substituted saturated or partially unsaturated heteroring moiety of 3 to 14 ring atoms comprising 1 to 6, preferably 1 to 4 heteroatoms, selected from O, N, P, S or Si; or an unsubstituted or substituted aromatic ring moiety of 3 to 14 C-atoms, preferably of 5-12 C atoms, optionally comprising 1 to 4 heteroatoms;
  wherein said carbocyclic ring, heteroring or aromatic ring system is optionally fused with another optionally substituted ring system having 4 to 14 ring atoms; and
  wherein said substituted carbocyclic ring, heteroring or aromatic ring system comprises 1 to 4 substituents selected independently from a functional group, or a saturated or partially unsaturated hydrocarbyl optionally bearing a functional group, or aromatic hydrocarbyl optionally bearing a functional group; or
R$^{2'}$ and R$^{3'}$ together with the carbon atom (C$^{1'}$) to which they are attached form an unsubstituted or substituted saturated or partially unsaturated carbocyclic ring moiety of 3 to 14 C-atoms, preferably of 5-12 C atoms; an unsubstituted or substituted saturated or partially unsaturated heteroring moiety of 3 to 14 ring atoms comprising 1 to 6, preferably 1 to 4 heteroatoms, selected from O, N, P, S or Si; or unsubstituted or substituted aromatic ring moiety of 3 to 14 C-atoms, preferably moiety of 5 to 12 C atoms; optionally comprising 1 to 4 heteroatoms;
  wherein said carbocyclic ring, heteroring or aromatic ring system is optionally fused with another optionally substituted ring system having 4 to 14 ring atoms; and
  wherein said substituted carbocyclic ring, heteroring or aromatic ring system comprises 1 to 4 substituents selected independently from a functional group or a saturated or partially unsaturated hydrocarbyl optionally bearing a functional group or aromatic hydrocarbyl optionally bearing a functional group; or
R$^2$ and R$^{2'}$ form together a bivalent substituted or unsubstituted saturated or partly unsaturated hydrocarbyl optionally containing 1 to 4 heteroatoms, wherein R$^2$ is linked to C$^1$ and R$^{2'}$ to C$^{1'}$, respectively, forming together with —C$^1$—O—O—C$^{1'}$— a substituted or unsubstituted saturated or partially unsaturated carbocyclic ring moiety of 3 to 14 C-atoms, preferably moiety of 5-12 C atoms, comprising optionally, in addition to said at least two O atoms, 1 to 4 further heteroatoms; wherein said carbocyclic ring or heteroring system is optionally fused with another ring system having 4-14 ring atoms;
and functional derivatives thereof;
with the proviso that at least two of R$^1$, R$^2$ and R$^3$, and at least two of R$^{1'}$, R$^{2'}$ and R$^{3'}$, respectively, are other than H or methyl Preferably, the compound of formula (I) is other than diphenylcyclohexyl peroxide.

U.S. Pat. No. 3,079,370 discloses a generic group of peroxides, but without specifying any peroxides with less than two methyls at carbon atoms corresponding C$^1$ and C$^{1'}$ in formula (I) above.

In a preferred embodiment, the compounds of the invention are subject to the third proviso that when R$^2$ and R$^3$ together with the carbon atom (C$^1$) to which they are attached form a carbocyclic ring moiety of 3 to 14 C-atoms as defined above, and R$^{2'}$ and R$^{3'}$ together with the carbon atom (C$^{1'}$) to which they are attached form the carbocyclic ring moiety of 3 to 14 C-atoms as defined above, then R$^1$ or R$^{1'}$ cannot be an unsubstituted aromatic hydrocarbyl.

It will be appreciated that whilst some peroxides are known per se they have not been disclosed in connection with polymer modification, in particular specific types of polymer modification and especially in cable cross-linking. The above second and third provisos are not therefore essential (although may be preferred) where the invention concerns modified polymer compositions and cables made therefrom.

The compounds of formula (I):

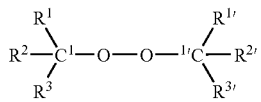

form a fourth independent group of compounds of the invention but all groups have the same unitary feature, i.e. a reduced amount of a volatile decomposition products compared to the prior art. All four groups of compounds of the invention can be made dependent on each other in any combination, and in any order.

Preferably, the compound of formula (I) as defined above results in $CH_4$ content of less than 300 ppm (weight), preferably of less than 200 ppm (weight), preferably less than 100 ppm (weight), more preferably is without $CH_4$ as a decomposition product thereof, during an industrial process for generating free radicals, e.g. during a modification step of a polymer composition.

The terms used for defining the compounds of formula (I) are well known in the organic chemistry. E.g. in moieties defined in formula (I):

When the substituents are defined herein as "hydrocarbyl", "aromatic hydrocarbyl", "alkyl" etc. it is evident that they mean "a hydrocarbyl group", "an alkyl group" etc. For the avoidance of doubt, the term "hydrocarbyl" used herein does not encompass aromatic groups as is clear from the definitions used herein. The substituents are referred herein interchangeably as "radical" or "group", as known in the field.

Any hydrocarbyl group of the invention will preferably have up to 40C, atoms, preferably up to 30 C atoms, e.g. up to 20 C atoms, especially up to 12 carbon atoms. Some highly preferred hydrocarbyls may have 1 to 6 carbon atoms.

Alkyl groups, alkenyl groups or alkynyl groups defined in formula (I) and (V) and in preferable embodiments, and subgroups thereof as defined above below and claims, will preferably have up to 40C, atoms, preferably up to 30 C atoms, e.g. up to 20 C atoms. Some highly preferred alkyl groups may have 1 to 12 carbon atoms, more preferably may be methyl or have 6 to 12 carbon atoms.

Cyclic alkyl or cyclic alkenyl groups will preferably having up to 20 C atoms, especially up to 12 carbon atoms. Some highly preferred cyclic alkyl groups may have 3 to 8 carbon atoms. Preferred cyclic alkenyl groups may have 5 to 8 carbon atoms.

Aromatic hydrocarbyl groups may have up to 40C, atoms, preferably up to 30 C atoms, e.g. up to 20 C atoms, especially up to 12 carbon atoms. Some highly preferred aromatic hydrocarbyls may have 6 to 12 carbon atoms.

The expression "partially unsaturated" means that the moiety may comprise one or more double or triple bonds and include alkenyl radicals comprising at least one double bond and alkynyl radicals comprising at least one triple bond. In case of "partially unsaturated cyclic hydrocarbyl" there can be one or more double bonds in the ring systems meaning that the ring is non-aromatic to differentiate said "partially unsaturated" ring moieties from "aromatic rings" such as phenyl or pyridyl radicals.

"Hetero atoms" present in the moieties of the invention are selected from N, O, P, S or Si. Such moieties include e.g. hydrocarbyl or cyclic hydrocarbyl moieties containing one or more heteroatoms, as defined above and below, and to heteroring or heterocyclic ring moieties as defined above and below, which are understood to contain C-atoms in addition to the heteroatoms.

The expression "monocyclic" includes monocyclic ring systems, such as cyclopentyl, cyclohexyl, cycloheptyl or phenyl.

The expression "multicyclic" in turn means herein fused ring systems, such as naphthyl.

Unless otherwise defined herein, the term "carbocyclic" means substituted or unsubstituted saturated or partially unsaturated cyclic hydrocarbyl ring system; or substituted or unsubstituted aromatic hydrocarbyl ring system.

The term "functional group" as a substituent is well known expression and includes i.a. —OH, —$NR_2$, wherein each R is independently H or (C1-C12)alkyl; COR", wherein R" is i.a. H, (C1-C12)alkyl or —$NR_2$, wherein each R is as defined for —$NR_2$; COOR", wherein R" is as defined for —COR". A further functional group is a halogen, such as —F, —Cl or —I.

Other preferred functional groups include alkoxy, e.g. $OC_{1-12}$alkyl, nitro, thiol, thio$C_{1-12}$alkyl and CN.

The term "optional" means "may or may not be present", e.g. "optionally substituted" cover the possibilities that a substituent is present and or not present. The term "unsubstituted" naturally means that no substituent is present.

When $R^2$ and $R^3$ together with $C^1$ to which they are attached form a ring system as defined above, or respectively, $R^{2'}$ and $R^{3'}$ together with $C^{1'}$ to which they are attached form a ring system as defined above, then, as $C^1/C^{1'}$ are fully valenced, it is understood herein that any optional substituents or substituent(s) Z as used above and below means substituents linked to ring atom(s) other than $C^1$ and $C^{1'}$, respectively.

In compounds (I), when $R^2$ and $R^3$ form together with $C^1$ an aromatic ring as defined above, then $R^1$ is not present, and, respectively, when $R^{2'}$ and $R^{3'}$ form together with $C^{1'}$ an aromatic ring, as defined above, then $R^{1'}$ is not present. Preferably however $R^2$ and $R^3$ together with $C^1$ and $R^{2'}$ and $R^{3'}$ together with $C^{1'}$ do not form an aromatic ring.

By functional derivative of compounds of formula (I) means that at least one of $R^1$, $R^2$, $R^3$, $R^{1'}$, $R^{2'}$, $R^{3'}$ is in form of functional derivative. The term "functional derivative" includes i.a. esters and salts of compounds of formula (I), in particular esters and salts of substituents $R^1$, $R^2$, $R^3$, $R^{1'}$, $R^{2'}$, $R^{3'}$. Preferred compounds (I) are those, wherein $R^1$, $R^2$, $R^3$, $R^{1'}$, $R^{2'}$, $R^{3'}$ are as defined above or below are not functional derivatives thereof.

A further preferred subgroup of compounds of formula (I) is a compound of formula (V)

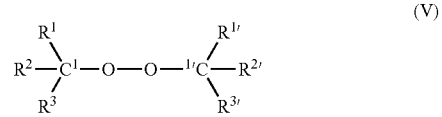

wherein the compounds are selected from any of the alternatives (i) to (iii):
(i) $R^1$ and $R^{1'}$ are each independently H, substituted or unsubstituted saturated or partially unsaturated hydrocarbyl;
wherein each of said substituted or unsubstituted saturated or partially unsaturated hydrocarbyl optionally comprises one or more heteroatoms;
wherein said substituted or unsubstituted saturated or partially unsaturated hydrocarbyl include (i) straight or branched chain saturated or partially unsaturated hydrocarbyls, (ii) straight or branched chain saturated or partially unsaturated hydrocarbyls which bear saturated or partially unsaturated cyclic hydrocarbyl and (iii) saturated or partially unsaturated cyclic hydrocarbyls;
wherein each of said saturated or partially unsaturated cyclic hydrocarbyl is independently a monocyclic or multicyclic ring system; and wherein said substituted saturated or partially unsaturated hydrocarbyl comprise independently 1 to 4 substituents selected from a functional group, a saturated or partially unsaturated hydrocarbyl optionally bearing a functional group or aromatic hydrocarbyl optionally bearing a functional group; and $R^2$, $R^{2'}$, $R^{3'}$ are each independently as defined above for $R^1$ and $R^{1'}$;

or (ii) $R^1$ and $R^{1'}$ are each independently an optionally substituted, preferably unsubstituted, monocyclic (C5-C7)aryl, preferably phenyl, wherein said substituted monocyclic (C5-C7)aryl comprises independently 1 to 4 substituents selected from a functional group, a saturated or partially unsaturated hydrocarbyl optionally bearing a functional group or aromatic hydrocarbyl optionally bearing a functional group; and $R^2$ and $R^{2'}$ are same and are both methyl; and $R^3$ and $R^{3'}$ are each independently H, substituted or unsubstituted saturated or partially unsaturated hydrocarbyl as defined above under (i) for $R^1$ and $R^{1'}$; or (iii)

$R^1$ and $R^{1'}$ are each independently H, substituted or unsubstituted saturated or partially unsaturated hydrocarbyl as defined above under (i) for $R^1$ and $R^{1'}$; and $R^2$ and $R^3$ together with the carbon atom ($C^1$) to which they are attached form an unsubstituted or substituted saturated or partially unsaturated carbocyclic ring moiety of 3 to 14 C-atoms, preferably 5-12 C atoms; or an unsubstituted or substituted saturated or partially unsaturated heteroring moiety of 3 to 14 ring atoms comprising 1 to 6, preferably 1 to 4 heteroatoms, selected from O, N, P, S or Si;

wherein said carbocyclic ring or heteroring is optionally fused with another optionally substituted ring system having 4 to 14 ring atoms; and wherein said substituted carbocyclic ring or heteroring system comprises 1 to 4 substituents selected independently from a functional group, or a saturated or partially unsaturated hydrocarbyl optionally bearing a functional group; and $R^{2'}$ and $R^{3'}$ together with the carbon atom ($C^{1'}$) to which they are attached form an unsubstituted or substituted saturated or partially unsaturated carbocyclic ring moiety of 3 to 14 C-atoms, preferably of 5-12 C atoms; an unsubstituted or substituted saturated or partially unsaturated heteroring moiety of 3 to 14 ring atoms comprising 1 to 6, preferably 1 to 4 heteroatoms, selected from O, N, P, S or Si;

wherein said carbocyclic ring or heteroring system is optionally fused with another optionally substituted ring system having 4 to 14 ring atoms; and wherein said substituted carbocyclic ring or heteroring system comprises 1 to 4 substituents selected independently from a functional group or a saturated or partially unsaturated hydrocarbyl optionally bearing a functional group;

with a proviso for alternatives (i) to (iii) that at least two of $R^1$, $R^2$ and $R^3$, and at least two of $R^{1'}$, $R^{2'}$ and $R^{3'}$, respectively, are other than H or methyl.

The compounds of formula (V) are preferably selected from the alternatives (ii) or (iii), more preferably from alternative (iii).

The substituents $R^1$, $R^2$, $R^3$, $R^{1'}$, $R^{2'}$ and $R^{3'}$ of compounds of formula (I) or (V) may each independently optionally carry 1 to 4 substituents as defined above. Said optional substituents may preferably be selected each independently from a functional group as defined above; saturated or partially unsaturated hydrocarbyl optionally bearing a functional group; or aromatic hydrocarbyl optionally bearing a functional group, as defined above, preferably from C1-12 hydrocarbyl (e.g. C1-6 alkyl) or from a functional groups as defined above. If a substituent is present, preferably 1 substituent is present.

Preferred aspects discussed above and below with respect to formula (I) also apply to compounds of formula (V).

The following subgroups of the compound of formula (I) of the invention represent some preferable embodiments and variants of the invention. It is also understood that said below subgroups further specify the substituents given above in formula (I). Each subgroups definition can be combined with any other subgroup to define further preferred subgroups within the broadest scope of compounds of formula (I) of the invention.

Moreover said above generally defined compounds of first, second and third group and said subgroups thereof, and the general definition for compounds of formula (I), as well as said subgroups thereof, can be combined in any combination in their uses for modifying polymers, to modification methods, to modified polymers and to articles comprising said modified polymers, as well as to preparation process thereof, which all aspects of the invention are discussed below.

In a preferred embodiment of the invention compounds of formula (I) are symmetrical.

A first preferable embodiment (A) comprises a subgroup (1) of the compound of formula (I) as defined above, wherein $R^2$ and $R^3$ together with carbon atom ($C^1$) to which they are attached form an optionally substituted carbocyclic ring moiety of 3 to 12 ring C-atoms or an optionally substituted heteroring moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms. This optionally fused ring system may also carry substituents, e.g. 1 to 4 groups Z as herein defined or may be unsubstituted.

Preferably $R^2$ and $R^3$ together with carbon atom ($C^1$) form a (C3-C12)carbocyclic ring moiety. The (C3-C12)carbocyclic ring moiety may optionally be substituted with 1 to 4 substituents which are preferably selected from substituents (Z) as defined later below.

In a subgroup (2) of the compound of formula (I) as defined above, $R^{2'}$ and $R^{3'}$ together with carbon atom ($C1'$) to which they are attached form an optionally substituted carbocyclic ring moiety of 3 to 12 ring C-atoms or an optionally substituted heteroring moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to14 ring atoms. This optionally fused ring system may also carry substituents e.g. 1 to 4 groups Z as herein defined or may be unsubstituted Preferably $R^{2'}$ and $R^{3'}$ together with carbon atom ($C^{1'}$) form a (C3-C12)carbocyclic ring moiety. Said (C3-C12)carbocyclic ring moiety may optionally be substituted with 1 to 4 substituents which are preferably selected from substituents (Z) as defined later below.

In a subgroup (3) of the compound of formula (I) as defined above, $R^2$ and $R^3$ together with the carbon atom ($C^1$) to which they are attached form an optionally substituted, saturated or partially unsaturated mono- or bicyclic (C4-C14) carbocyclic ring, preferably unsubstituted saturated monocyclic (C5-C8) carbocyclic ring, such as cyclopentyl, cyclohexyl or cycloheptyl, preferably cyclohexyl or cyclopentyl. Also preferably, in said subgroup (3), $R^2$ and $R^3$ together with the carbon atom ($C^1$) to which they are attached form a saturated monocyclic (C5-C8) carbocyclic ring, such as cyclopentyl, cyclohexyl or cycloheptyl, preferably cyclohexyl or cyclopentyl, which is substituted with 1 to 4 substituents which are preferably selected from substituents (Z) as defined later below.

In a subgroup (4) of the compound of formula (I) as defined above, $R^{2'}$ and $R^{3'}$ together with the carbon atom ($C^{1'}$) to which they are attached form an optionally substituted, saturated or partially unsaturated mono- or bicyclic (C4-C14) carbocyclic ring, preferably unsubstituted saturated monocyclic (C5-C8)carbocyclic ring, such as cyclopentyl, cyclohexyl or cycloheptyl, preferably cyclohexyl or cyclopentyl. Also preferably in said subgroup (4) $R^{2'}$ and $R^{3'}$ together with the carbon atom ($C^{1'}$) they are attached to form a saturated monocyclic (C5-C8) carbocyclic ring, such as cyclopentyl, cyclohexyl or cycloheptyl, preferably cyclohexyl or cyclopentyl, which is substituted with 1 to 4 substituents which are preferably selected from substituents (Z) as defined later below, e.g. one substituent Z.

More preferably, in a subgroup (5a) of the compounds (I), $R^2$ and $R^3$ and, respectively, $R^{2'}$ and $R^{3'}$ form carbocyclic rings as defined in formula (I), more preferably form carbocyclic rings as defined in subgroups (1) and, respectively, (2), even more preferably form carbocyclic rings as defined in subgroups (3) and, respectively (4), which may be substituted with 1 to 4 substituents which are preferably selected from substituents (Z) as defined later below, e.g. one substituent Z.

In an even preferable subgroup (5b) of the compound of formula (I) as defined above, $R^2$ and $R^3$ together with the carbon atom ($C^1$) to which they are attached form a ring system as defined in subgroup (3) and $R^{2'}$ and $R^{3'}$ together with the carbon atom ($C^{1'}$) to which they are attached form a ring system as defined in subgroup (4), whereby the ring system formed by $R^{2'}$ and $R^{3'}$ together with the carbon atom ($C^{1'}$) is identical to the ring system formed by $R^2$ and $R^3$ together with the carbon atom ($C^1$).

Subgroups 1 to 5b form part of embodiment (A) of the invention, i.e. where the substituents $R^1$ and $R^{1'}$ are as defined in formula (I) above. These subgroups can be combined with any $R^1$ and $R^{1'}$ substituent.

Highly preferred subgroups of embodiment (A), are the subgroup (5a) and even more preferably subgroup (5b).

A second preferable embodiment (B) comprises a subgroup (6) of the compound of formula (I) as defined above, wherein $R^1$, $R^2$, $R^3$, $R^{1'}$, $R^{2'}$ and $R^{3'}$ each independently is optionally substituted mono- or multicyclic (C5-C14)aryl; optionally substituted mono- or multicyclic (C5-C14)heteroaryl; optionally substituted mono- or multicyclic (C4-C14)cycloalkyl; optionally substituted mono- or multicyclic (C4-C14)heterocyclyl; optionally substituted straight or branched chain (C1-C50)alkyl, preferably straight chain (C1-C30)alkyl; optionally substituted straight or branched chain, preferably straight chain, (C2-C50)alkenyl, preferably straight chain (C2-C30)alkenyl; or optionally substituted straight or branched chain, preferably straight chain, (C2-C50)alkynyl, preferably straight chain (C2-C30)alkynyl; or optionally substituted straight or branched chain (C1-C50) heteroalkyl comprising 1 to 4 heteroatoms selected from N, O, S or Si. The optionally substituted moieties as defined above contain preferably 1 to 4 substituents which are preferably selected from substituents (Z) as defined later below.

Preferable embodiments (B) of compounds (I) are any of subgroups (7) to (11), optionally in any combinations thereof:

In a subgroup (7) of the compound of formula (I) as defined above, $R^2$, $R^{2'}$, $R^3$ and $R^{3'}$ are each independently selected from unsubstituted straight chain (C1-C50)alkyl, preferably (C1-C30)alkyl, more preferably (C1-C20)alkyl, such as hexyl, heptyl, octyl, decyl, undecyl, docedyl, preferably decyl.

In a subgroup (8) of the compound of formula (I) as defined above, $R^2$ and $R^{2'}$ each represents same radical and, respectively, $R^3$ and $R^{3'}$ each represents same radical.

In a subgroup (9) of the compound of formula (I) as defined above, $R^2$ and $R^{2'}$ are same and each represents methyl.

In a subgroup (10) of the compound of formula (I) as defined above, $R^2$ and $R^{2'}$ are same and each represents (C6-C30)alkyl.

In a subgroup (11) of the compound of formula (I) as defined above, $R^3$ and $R^{3'}$ are same and each represents (C6-C30)alkyl.

A third preferable embodiment (C) of the compounds (I) is a subgroup (12). In a subgroup (12) of the compound of formula (I) as defined above $R^1$ and $R^{1'}$ are same or different, preferably same, and each represents optionally substituted, saturated or partially unsaturated cyclic hydrocarbyl of 5 to 14 ring atoms optionally containing 1 to 4 heteroring atoms selected from N, O, P, S or Si, or optionally substituted mono- or multicyclic (C5-C14)aryl, preferably unsubstituted monocyclic (C5-C7)aryl. Also preferably in said subgroup (12) $R^1$ and $R^{1'}$ are same or different, preferably same and each represents substituted mono- or multicyclic (C5-C14)aryl, preferably monocyclic (C5-C7)aryl which is substituted with 1 to 4 substituents which are preferably selected from substituents (Z) as defined later below.

A fourth preferable embodiment (D) of the compounds (I) is a subgroup (13). In a subgroup (13) of the compound of formula (I) as defined above, $R^1$ and $R^{1'}$ are same or different, preferably same, and each represents optionally substituted branched or straight chain, preferably unsubstituted straight chain, (C6-C30)alkyl or methyl. This embodiment also covers the option that $R^1$ and $R^{1'}$ are same or different, preferably same, and each represents optionally substituted branched or straight chain, preferably unsubstituted straight chain, (C2-C5)alkyl.

For the avoidance of doubt it is stressed that the preferred definitions of $R^1$ and $R^{1'}$ given in subgroups 12 and 13 can be combined with any of the preferred substituent definitions of subgroups 1 to 11 to form even more preferred compounds.

Further preferred compounds of formula (I) are of subgroup (14) with the further proviso that at least two of $R^1$, $R^2$ and $R^3$, and at least two of $R^{1'}$, $R^{2'}$ and $R^{3'}$, respectively, are other than H, methyl, iso-butyl or tert-butyl.

Further preferred compounds of formula (I) are of subgroup (15) with the further proviso that at least two of $R^1$, $R^2$ and $R^3$, and at least two of $R^{1'}$, $R^{2'}$ and $R^{3'}$, respectively, are other than H, methyl, ethyl, 1-propyl, isopropyl, 1-butyl, isobutyl or tert-butyl.

Further preferred compounds of formula (I) are of subgroup (16) with the further proviso that at least two of $R^1$, $R^2$ and $R^3$, and at least two of $R^{1'}$, $R^{2'}$ and $R^{3'}$, respectively, are each other than $CH_3$ preferably other than straight or branched chain saturated or partially unsaturated (C1-C3) hydrocarbyl, more preferably other than straight or branched chain saturated or partially unsaturated (C1-C4)hydrocarbyl, Further preferred compounds of formula (I) are of subgroup (17) with the further proviso that at least two of $R^1$, $R^2$ and $R^3$, and at least two of $R^{1'}$, $R^{2'}$ and $R^{3'}$, respectively, are preferably other than straight or branched chain saturated or partially unsaturated (C2-C3)hydrocarbyl, more preferably other than straight or branched chain saturated or partially unsaturated (C2-C4)hydrocarbyl.

Each of subgroups (14), (15), (16) and (17) are useful for embodiments wherein very high purity products, e.g. polymers, are desirable after the modification step with compound (I).

Further preferable compounds of formula (I) as defined above form subgroup (Ia). In this subgroup $R^1$ and $R^{1'}$ are same or different, preferably same, and each represents optionally substituted branched or straight chain, preferably unsubstituted straight chain, (C2-C30)alkyl, which is preferably (C6-C30)alkyl; or methyl, more preferably methyl; and $R^2$ and $R^3$ together with $C^1$ atom to which they are attached form an optionally substituted, saturated or partially unsaturated mono- or bicyclic (C4-C14)carbocyclic ring, preferably optionally substituted, more preferably unsubstituted saturated monocyclic (C5-C8)carbocyclic ring;

and $R^{2'}$ and $R^{3'}$ together with the carbon atom ($C^{1'}$) to which they are attached form an optionally substituted, saturated or partially unsaturated mono- or bicyclic (C4-

C14)carbocyclic ring, preferably optionally substituted, more preferably unsubstituted saturated monocyclic (C5-C8)carbocyclic ring; whereby the ring system formed by $R^2$ and $R^3$ together with $C^1$ is preferably identical to a ring system formed by $R^{2'}$ and $R^{3'}$ together with $C^{1'}$.

Any substituted moiety preferably contains 1 to 4 substituents (Z) as defined later below, e.g. one substituent Z.

Especially preferred cyclic radicals are cyclopentyl and cyclohexyl in this subgroup.

$R^3$ and $R^{3'}$ are same and are both optionally substituted branched or straight chain (C6-C50)alkyl, more preferably unsubstituted straight chain (C6-C30)alkyl, such as (C6-C20)alkyl.

Any substituted moiety preferably contains 1 to 4 substituents (Z) as defined later below, e.g. one substituent Z.

One of the preferred compounds of formula (I) of this preferable subgroup of (Ib) the compound of formula (Ib) which is Di-(1-methyl-1-phenylundecyl)peroxide (formula Ib):

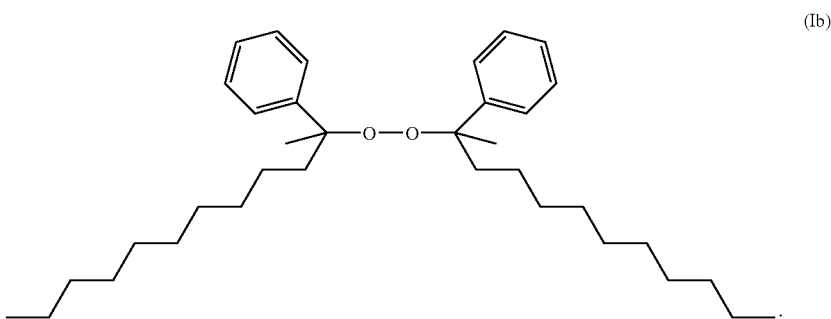 [SMILES: CCCCCCCCCCC(C)(OOC(C)(CCCCCCCCCC)c1ccccc1)c1ccccc1]

(Ib)

One of the preferred compounds of this more preferable subgroup of (Ia) is the compound of formula (Ia) which is di-(1-methylcyclohexyl)peroxide (formula Ia):

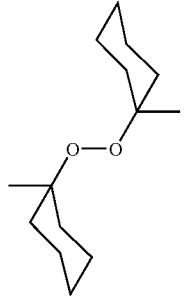

(Ia)

Other preferred compounds of subgroup (Ib) include di-(1-methyl-1-phenylheptyl)peroxide

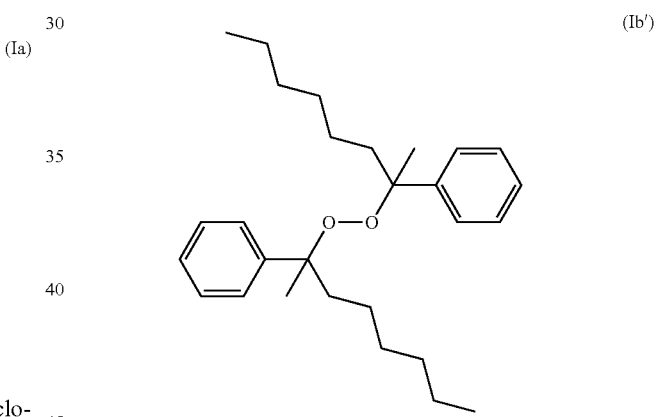

(Ib')

Another preferred compound is (Ia'), di(1-methylcyclopentyl)peroxide.

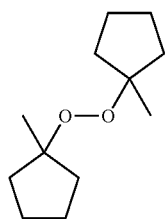

(Ia')

A second preferred subgroup (Ib) of compounds (I) is an embodiment (B) as defined above, wherein $R^2$, $R^{2'}$, $R^3$ and $R^{3'}$ are as defined in subgroup (6) above, preferably as defined in subgroups (7) to (11), and $R^1$ and $R^{1'}$ are according to preferable embodiment (C).

In preferable subgroup (Ib) of compounds of formula (I) as defined above, $R^1$ and $R^{1'}$ are both same and represent an optionally substituted, preferably unsubstituted, monocyclic (C5-C7)aryl;

$R^2$ and $R^{2'}$ are same and are both methyl; and

A third preferred subgroup (Ic) of compounds (I) is an embodiment (B) as defined above, wherein $R^2$, $R^{2'}$, $R^3$ and $R^{3'}$ are as defined in subgroups (7), (8), (10) or (11) and $R^1$ and $R^{1'}$ are according to preferable embodiment (C) or (D).

In one preferable subgroup (Ic) of compounds of formula (I) as defined above, $R^1$ and $R^{1'}$ are both same and represent an optionally substituted, preferably unsubstituted, monocyclic (C5-C7)aryl;

$R^2$ and $R^{2'}$ are same and are both optionally substituted branched or straight chain, preferably unsubstituted straight chain, (C6-C50)alkyl, more preferably unsubstituted straight chain (C6-C30)alkyl, such as (C6-C20) alkyl; and $R^3$ and $R^{3'}$ are same and are both optionally substituted branched or straight chain, preferably unsubstituted straight chain, (C6-C50)alkyl, more preferably unsubstituted straight chain (C6-C30)alkyl, such as (C6-C20) alkyl.

In a further preferable subgroup (Id) of compounds (I), $R^1$ and $R^{1'}$ are according to embodiment (D), preferably $R^1$ and $R^{1'}$ are same and are both methyl; and $R^2$ and $R^{2'}$ are same and are both optionally substituted branched or straight chain, preferably unsubstituted straight chain, (C6-C50)alkyl, more preferably unsubstituted straight chain (C6-C30)alkyl, such as (C6-C20)alkyl; and $R^3$ and $R^{3'}$ are same and are both optionally substituted branched or straight chain, preferably unsubstituted branched or straight chain, (C6-C50)alkyl, more preferably unsubstituted straight chain (C6-C30)alkyl, such as (C6-C20) alkyl.

In other preferred embodiments of the invention none of $R^1$-$R^3$ or $R^{1'}$-$R^{3'}$ represents an aromatic group.

Where one or more of $R^1$-$R^3$ or $R^{1'}$-$R^{3'}$ represents an aromatic radical this is especially preferably a phenyl group optionally substituted by one to three, such as one, group Z as hereinbefore defined.

Where one or more of $R^1$-$R^3$ or $R^{1'}$-$R^{3'}$ represents a cycloalkyl radical this is especially preferably a cyclohexyl or cyclopentyl group optionally substituted by one to three, such as one, group Z as hereinbefore defined.

In the compounds of formula (I) there are preferably no more than two cycloalkyl groups. In further preferred compounds there are no more than two cyclic groups (e.g. carbocyclic, heterocyclic or aromatic groups) in the compound of formula (I). In a most preferred embodiment of the invention there are two cyclic groups which each are formed by $R^2$ and $R^3$ together with $C^1$ and by $R^{2'}$ and $R^{3'}$ together with $C^{1'}$.

These preferred embodiments apply to any compound of formula (I), in particular any compounds forming part of the sub groups above.

The optional substituents of embodiments (A), (B), (C), (D), (Ia), (Ib), (Ic) and (Id) (and any optional substituent present in the compounds of the invention) are preferably one to four substituents (Z) selected from a saturated or partially unsaturated (C1-C30)hydrocarbyl, a functional group, a saturated or partially unsaturated (C1-C30)hydrocarbyl which optionally bears a functional group as defined above, or from an aromatic hydrocarbyl, which optionally bears a functional group. Preferred substituents (Z) are branched or straight chain (C1-C20)hydrocarbyl or a functional group as defined above. Preferably, no substituted radical should carry more than 1 substituent Z.

Highly preferred substituents (Z) which can be present on any optionally substituted moiety of the compounds of the invention include C1-6 alkyls, especially methyl, ethyl, propyl or tertbutyl; C5-8 cycloalkyl; or phenyl. Where a methyl substituent carries a phenyl side group, the formed group is, of course, benzyl. Where an alkyl substituent carries a cycloalkyl side group, the formed group is, of course, alkylcycloalkyl, and so on.

Where a phenyl group carries one substituent it is preferably para to the binding to carbon atom $C^1/C^{1'}$. Where a cyclohexyl group carries one substituent, it is preferably beta to the $C^1/C^{1'}$ carbon atom.

Said specific compounds of formula (Ia), (Ib), (Ia') and (Ib') are novel as such.

The invention is further directed to the compound of formula (Ia) as defined above. Thus the invention is directed to the compound of formula (Ib) as defined above. The invention is further directed to the compound of formula (Ia') as defined above. The invention is further directed to the compound of formula (Ib') as defined above.

The most preferred subgroups of formula (I) and of formula (V) are subgroups Ia and Ib, even preferably subgroups (Ia) including the compounds (Ia) and (Ia').

Highly preferred compounds of the invention are therefore of formula (II)

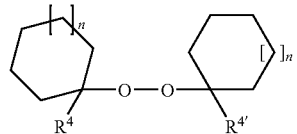

(II)

wherein n 0 to 3, preferably 0 or 1 forming a cyclopentyl or cyclohexyl group respectively, $R^4$ and $R^{4'}$ each independently represent a straight chain alkyl group having 1 to 30 carbon atoms, preferably methyl or straight chain alkyl group having 6 to 20, preferably 6 to 12, carbon atoms, more preferably methyl, and
  wherein one or preferably both ring systems independently are unsubstituted or optionally substituted by 1 to 4 substituents Z as defined above. It is most preferred that the ring systems are unsubstituted.

Further highly preferred compounds of the invention are also of formula (III)

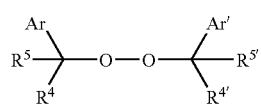

(III)

wherein Ar and Ar' independently represent a phenyl, benzyl or naphthyl group optionally substituted by 1 to 4 substituents Z as defined above,
  $R^4$ and $R^{4'}$ each are methyl; and
  $R^5$ and $R^{5'}$ each independently represent a straight chain alkyl group having C6-30 carbon atoms, preferably 6 to 20, more preferably 6 to 12 carbon atoms, Most preferred is compounds of formula (II) as defined above.

Preparation of the Compounds of Formula (I)

The compounds of the invention include novel and known compounds. The use of the known compounds as a free radical generating agent, preferably for modifying a polymer composition, is novel. Thus said known compounds may be commercially available. Alternatively, the compounds of the invention can be prepared according to or analogously to known methods described in the chemical literature.

As an example, the compounds (I) as defined above can be prepared according to the following scheme 1 using known procedures which are described in a literature and well known for a skilled person in the art.

Peroxides of formula (I) as defined above can be prepared in several known ways, and more specifically tertiary peroxides can be prepared from the corresponding tertiary alcohols under acidic conditions to give compounds (I). The alcohols are either commercially available, or can be prepared from a suitable ketone combined with a organometallic reagent, more specifically a Grignard (RMgX, where X is an halogen) or organolithium (RLi) reagent.

Scheme 1

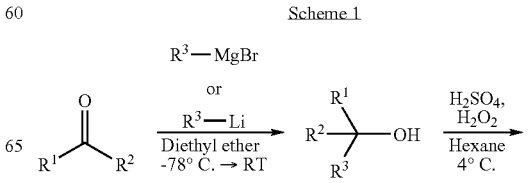

-continued

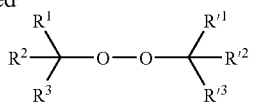

References to synthetic methods are as follows:
1) Milas, N. A., Surgenor, D. M., J. Am. Chem. Soc., 643-644, 1946
2) Hey, D. H., Stirling, C. J. M., Williams, G. H, J. Chem. Soc., 1054-1058, 1957
3) Organic Synthesis, Smith, M. B., The McGraw-Hill Companies Inc., 2002

Work up procedures are routine. The formed tertiary alcohol and corresponding peroxide can be purified by removing the solvent in vacuo and purifying the residue by any of the methods known to those skilled in the art, such as crystallization.

Compounds of formula (I) can also be prepared from tertiary alcohols via conversion to a hydroperoxide —OOH type compound. This process allows the preparation of asymmetrical peroxides. Thus for example, a tertiary alcohol can be converted to a tertiary halide and reacted with hydrogen peroxide, perhaps in the presence of a promoter such as silver trifluoroacetate and a non nucleophilic base such as sodium hydrocarbonate to form a teriary hydroperoxide. The tertiary hydroperoxide can then be reacted with the a tertiary bromide (perhaps the same as used earlier in the reaction or optionally a difference tertiary bromide) to form the final diperoxide materials of formula (I). Again, a promoter such as silver trifluoroacetate/NaHCO$_3$ might be used. These reactions are summarised in the scheme below:

Scheme 2

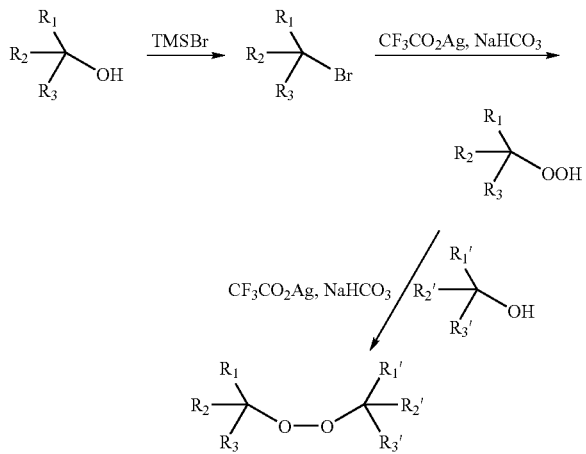

In view of the low levels of volatile decomposition products formed during activation of the peroxides of the invention, the present invention reduces or minimises the fire, explosion and health risks in an working environment caused by the use of free radical generating agents compared to the prior art.

The first group and the second of compounds of the invention as defined above and in claim 1-3 in terms of the decomposition product(s) thereof, the third group of compounds of formula (I) of the invention as defined above with a general formula and by means of the preferable subgroups, in any combinations, as well as in claims 4-15 below, are abbreviated herein below as "Compound of the invention" for the sake of convenience, only. The preferred subgroup of Compound of the invention is compounds of formula (I) including the preferable embodiments and subgroups as defined above and in claims.

End Uses and End Applications of the Invention
I. Modification Method of Polymers
1. Crosslinking of Polymers The below defined crosslinking step is preferable for use in the crosslinking process of a cable of the invention as defined above and in below claims. Moreover said crosslinking step as such forms an independent invention.

One preferable embodiment of said modification method of polymers is crosslinking of polymers by radical reaction using one or more free radical generating agents, wherein at least one said free radical generating agent is Compound of the invention as defined above.

The term "crosslinking" is well known and commonly used in the polymer field and means forming, primarily, of interpolymer crosslinks (bridges) via radical reaction.

In principle, the polymers usable in the crosslinking process of the present invention are not limited and can be polymers of any type.

In one preferable embodiment, said crosslinkable polymer is a polyolefin which can be a homopolymer of an olefin or a copolymer of an olefin with one or more comonomers.

One preferable group of crosslinkable polyolefins includes homopolymer of ethylene or copolymer of ethylene with one or more comonomers, such as 1) a branched polyethylene homo- or copolymer produced in high pressure by radical polymerisation and well known as low density polyethylene (LDPE) homo or copolymer or 2) a linear polyethylene homo- or copolymer produced by low pressure polymerisation using a coordination catalyst, such as well known linear very low density polyethylene, linear low density polyethylene (LLDPE), medium density polyethylene (MDPE) or high density polyethylene (HDPE), 3) polypropylene polymers, including homopolymers and random polymers of polypropylene and heterophasic copolymer of propylene, or 4) polybutylene polymers, as non-limiting examples only.

One preferable group of crosslinkable ethylene polymers is 1) LDPE homopolymer or LDPE copolymer with one or more comonomers including C3 or higher alpha-olefin comonomer(s), polar comonomers and comonomers with at least two double bonds, such as diene comonomers. High pressure polymerisation is a well known technology in the polymer field and can be effected in a tubular or an autoclave reactor, preferably, in a tubular reactor. Further details about high pressure radical polymerisation are given in WO 93/08222.

In one preferable embodiment the crosslinkable LDPE is an LDPE copolymer of ethylene with a polar group containing comonomer(s) and, optionally, with other comonomer(s). As examples of comonomers having polar groups may be mentioned the following: (a) vinyl carboxylate esters, such as vinyl acetate and vinyl pivalate, (b) (meth)acrylates, such as methyl(meth)acrylate, ethyl(meth)acrylate, butyl(meth)acrylate and hydroxyethyl(meth)acrylate, (c) olefinically unsaturated carboxylic acids, such as (meth)acrylic acid, maleic acid and fumaric acid, (d) (meth)acrylic acid derivatives, such as (meth)acrylonitrile and (meth)acrylic amide, and (e) vinyl ethers, such as vinyl methyl ether and vinyl phenyl ether.

Amongst these comonomers, vinyl esters of monocarboxylic acids having 1 to 4 carbon atoms, such as vinyl acetate, and (meth)acrylates of alcohols having 1 to 4 carbon atoms, such as methyl (meth)acrylate, are preferred.

Especially preferred comonomers are butyl acrylate, ethyl acrylate and methyl acrylate. Still more preferably, the polar copolymer comprises a copolymer of ethylene with $C_1$- to $C_4$-alkyl acrylate, such as methyl, ethyl, propyl or butyl acrylates or vinyl acetate, or any mixture thereof.

The term "(meth)acrylic acid" and "(meth)acrylate" are intended to embrace both acrylic acid and methacrylic acid and, respectively "methacrylate" and "acrylate".

Another preferable group of crosslinkable polymers are unsaturated polymers, wherein the unsaturation is provided by double bonds, preferably carbon-carbon (C—C) double bonds. More preferably, said unsaturated polymer comprises carbon-carbon double bonds, in a total amount of carbon-carbon double bonds/1000 carbon atoms of 0.1 or more, more preferably of 0.2 or more, and most preferably more than 0.37, more preferably at least 0.40. Preferably in this embodiment the total amount of carbon-carbon double bonds in the unsaturated polymer is of at least 0.5/1000 carbon atoms. The upper limit of the amount of carbon-carbon double bonds present in the unsaturated polymer is not limited and may preferably be less of than 5.0/1000 carbon atoms, preferably less than 3.0/1000 carbon atoms, or more preferably less than 2.5/1000 carbon atoms.

Unsaturated polymer means herein a homopolymer, wherein the unsaturation is provided by a chain transfer agent, or a copolymer, wherein the unsaturation is provided by polymerizing a monomer in the presence of at least a polyunsaturated comonomer and optionally in the presence of a chain transfer agent. Preferably, said carbon-carbon double bonds present in the unsaturated polymer include vinyl groups, which vinyl groups originate preferably from i) a polyunsaturated comonomer, from ii) a chain transfer agent, or from iii) any mixture thereof.

Said polyunsaturated comonomer is preferably a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof.

In addition to the vinyl groups originating from the polyunsaturated comonomer, the content of vinyl groups may also be originated, alone or additionally, from a chain transfer agent which introduces vinyl groups, such as propylene.

Preferred unsaturated polyolefins are crosslinkable LDPE as defined above which has the above C—C double bond unsaturation provided by copolymerising ethylene in high pressure together with at least a polyunsaturated comonomer, preferably diene as defined above, and/or in the presence of chain transfer agent as defined above. Moreover, said crosslinkable LDPE suitable for the present invention is preferably an LDPE copolymer which is prepared by copolymerising ethylene with at least one polyunsaturated comonomer, preferably with at least one diene as defined above. Such polymers are well known and described e.g. in WO93/08222, EP1695996 or WO2006/131266.

Alternatively, or in addition to the double bonds of the unsaturated polymer, the polymer composition of the invention may contain additives, such as known crosslinking boosters, which provide double bonds to the polymer composition. In such case the amount of these double bonds may be the preferable amount as given above for C—C double bonds of unsaturated polymer, or if an unsaturated polymer is present, then the above given preferable amounts of C—C double bonds of polymer is preferably the total sum of the double bonds originating from unsaturated polymer and from the double bonds originating from such additives.

Also linear ethylene polymers prepared using said low pressure polymerisation are very suitable for the crosslinking of the invention. As an example VLLDPE, LLDPE, MDPE and HDPE polymers can be mentioned. They can be produced in a known manner in a single or multistage processes using one or more of e.g. Ziegler-Natta catalysts, single site catalysts, including metallocenes and non-metallocenes, and Cr-catalysts. All said catalysts are very well known in the field. The multistage process includes any combinations of polymerisation processes, such as slurry polymerisation, solution polymerisation, gas phase polymerisation, or any combinations thereof, in any order.

Generally, crosslinkable polymers that are usable in the present invention include any known polymers, e.g. commercially available polymers, or they can prepared in a known manner according to or analogously to polymerisation process described in the literature. Naturally any mixtures of polymers can also be used.

The amount of the Compound of the invention as a free radical generating agent used for the crosslinking is not critical and can vary depending on the desired crosslinking degree and the type and characteristics of the crosslinkable polymer. As an example only, the amount of said free radical generating agent of the invention may be less than 10.0 wt %, less than 6.0 wt %, less than 5.0 wt %, less than 3.5 wt %, e.g. between 0.1 to 3.0 wt %, such as 0.2 to 2.6 wt %, based on the weight of the crosslinkable polymer composition, depending i.a. on the molecular weight of Compound and the desired degree of crosslinking.

The crosslinking may be carried out in a known manner, typically in elevated temperature, such as 140° C. or more, preferably 150° C. or more. And said step may be effected under slightly pressurised conditions, e.g. up to 20 bar, e.g. up to about 13 bar, pressure.

II. Polymer Composition

The below defined polymer composition is preferable for use in the crosslinking process of a cable of the invention as defined above and in below claims. Moreover said polymer composition as such forms an independent invention.

The invention thus provides also a polymer composition comprising a free radical generating agent which is Compound of the invention as defined above. Preferably the polymer composition comprises at least one polymer component and at least one free radical generating agent, which is a compound of formula (I) including the preferred embodiments and subgroups thereof, as defined above or in claim 1 or dependent claims thereof.

Also a process for producing a polymer composition is provided, wherein the Compound of the invention is added to a polymer composition.

The amount of the Compound of the invention can naturally vary depending on the desired modification method. Examples of the amounts are given e.g. above under "1. Crosslinking of polymers". Moreover, the polymer composition of the invention may additionally, comprise further free radical generating agent(s), such as another Compound of the invention.

Furthermore, polymers suitable for the polymer composition of the invention are not limited and include e.g. polymers 1) to 4), preferably 1) LDPE homo and copolymers, as described above under "1. Crosslinking of polymers".

The polymer composition of the invention can be in a well known powder or pellet form, or in a form of polymer melt. Polymer powder of the invention may i.a. be obtained directly from the polymerization process, optionally further processed, e.g. sieved, and/or optionally treated or mixed with further components.

The polymer pellets of the invention can be produced in a well known manner. In one process for forming the pellets of the invention the polymer powder or melt obtained from a polymerization process, or alternatively polymer pellets, may optionally be mixed with other components and pelletised e.g. by extrusion in a known pelletising equipment. The Compound of the invention may be added 1) to a mixture of a polymer composition prior to the pelletising step or 2) after the pelletising step by adding the Compound of the invention to the preformed pellets by mixing and/or impregnating, optionally in a carrier medium, to obtain the polymer pellets of the invention.

Alternatively, Compound of the invention can added to the polymer powder or polymer pellets directly in a production line of an end product, such as cable production line. Addition can be effected in a mixing step preceding the end product formation step or during the end product formation step, e.g. cable extrusion step. Such addition can be effect to the polymer composition in powder or pellet form or to a melt of said powder or pellets which melt may optionally contain further components.

Accordingly the invention provides a polymer powder, polymer pellets or a polymer melt comprising a polymer composition and a free radical forming agent, wherein said free radical forming agent is Compound of the invention.

In one preferable embodiment of the pellets or powder of the invention, said pellets or powder are in a package, such as a container including boxes and bags. Such containers can be supplied for further use. E.g. an end producer, e.g. a cable producer, can then use the pellets of the invention as such for polymer modification step without need to add any free radical generating agent.

Moreover, the polymer composition of the invention may further contain other components, such as other polymers as mentioned above, or additives, such as stabilizers.

In one preferable embodiment of the polymer composition of the invention said polymer composition further comprises additives, such as one or more of antioxidants, stabilisers, processing aids, scorch retardants, crosslinking boosters or water tree retardants, or any mixtures thereof. As antioxidant, sterically hindered or semi-hindered phenols, optionally substituted with functional group(s), aromatic amines, aliphatic sterically hindered amines, organic phosphates, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As further additives, flame retardant additives, acid scavengers, fillers, such as carbon black, and voltage stabilizers can be mentioned. All the above mentioned additives are well known in polymer field. Such compositions are very useful for wire and cable applications, such as for cables of the invention discussed below.

The invention further provides (a) a process for crosslinking a polymer composition via free radical formation using one or more free radical generating agents, wherein the crosslinking is effected by producing methane as a decomposition product of said crosslinking step in an amount of less than 300 ppm (weight), when determined according to a method as described below under "GC-analysis protocol". Preferably said crosslinking step is carried out without producing methane as a decomposition product of said crosslinking step. A preferable embodiment of said process for crosslinking a polymer composition by radical reaction using a free radical generating agent results in a crosslinked polymer composition and produces a $CH_4$ content of less than 300 ppm (weight), preferably of less than 200 ppm (weight), preferably of less than 100 ppm (weight), more preferably of from 0 to 50 ppm (weight) when measured as defined below under "GC-analysis protocol".

The invention provides also independently (b) a process for crosslinking a polymer composition via free radical formation using one or more free radical generating agents, wherein the crosslinking is carried out using a Compound, preferably compound of formula (I), of the invention. A preferred crosslinking process is the above process (b). In demanding end applications it is preferred that said crosslinking according to process (b) is carried out using a free radical generating agent which does not produce methane ($CH_4$) during crosslinking step.

Preferably the crosslinking process is carried out under "crosslinking conditions" which means herein under free radical agent decomposing conditions. E.g. an elevated temperature is typically used for accelerating the decomposition of the radical and thus the crosslinking step. Moreover, "in the absence of $CH_4$ originating from said free radical generating agent" means that the free radical generating agent does not result in $CH_4$ as a decomposition product thereof during the crosslinking step.

The invention also provides a crosslinked polymer composition obtainable by the crosslinking process of the invention as defined above.

In a preferable embodiment of the crosslinking process and the crosslinked polymer composition of the invention said free radical generating agent is Compound of the invention.

Said crosslinking process is further defined above under "1.Crosslinking of polymers".

III. End Applications

1. Cable

The below defined cable is preferable for use in the crosslinking process of a cable of the invention as defined above and in below claims. Moreover said cable as such forms an independent invention.

The new principle of the invention is highly feasible in wire and cable applications of polymers.

Accordingly, the invention further provides a cable comprising the polymer composition of the invention as defined above and below, preferably under "II. Polymer composition", referred herein below as "polymer composition of the invention".

In one preferable embodiment said cable comprises a conductor surrounded with one or more layers, wherein at least one layer comprises said polymer composition of the invention.

The term "conductor" means herein above and below that the conductor comprises one or more wires. Moreover, the cable may comprise one or more such conductors. Preferably the conductor is an electrical conductor.

In one embodiment of the cable of the invention at least one layer is an insulation layer which comprises said polymer composition of the invention.

In another embodiment of the cable of the invention at least one layer is a semiconductive layer comprising said polymer composition of the invention. "Semiconductive layer" means herein that said layer comprises carbon black and has a volume resistivity of 100,000 $\Omega$-cm or below when measured at 23° C. or 90° C., or, when measured according to ISO 3915 using a plaque, has a volume resistivity of 100 $\Omega$-cm or below at 23° C., or of 1000 $\Omega$-cm or below at 90° C.

In further embodiment, the cable of the invention comprises a jacketing layer and optionally one or more layers selected from an insulation layer and semiconductive layer surrounded by said jacketing layer, wherein said jacketing layer comprises said polymer composition of the invention.

As one further embodiment of the cable of the invention, a low voltage cable is provided which comprises an insulation layer and optionally a jacketing layer, wherein said insulation layer comprises said polymer composition of the invention.

As a further embodiment of the cable of the invention, a power cable is provided which comprises at least an inner semiconductive layer, insulation layer and an outer semiconductive layer, in that order, optionally surrounded by a jacketing layer, wherein at least one of said layers, preferably at least inner semiconductive layer and insulation layer, comprises said polymer composition of the invention.

In the context of the present invention, a low voltage cable is a cable operating in voltages 1 kV or below. A power cable is defined to be a cable transferring energy operating at any voltage, typically operating at voltages higher than 1 kV. The voltage applied to the power cable can be alternating (AC), direct (DC), or transient (impulse). In a preferred embodiment, the power cable prepared according to the present invention is operating at voltages higher than 6 kV and are known i.a. as medium voltage (MV), high voltage (HV) and extra high voltage (EHV) power cables, which terms have well known meaning and indicate the operating level of such cable.

Said outer semiconductive layer of said power cable of the invention can be non-strippable, i.e. bonded and non-peelable, or strippable, i.e. non-bonded and peelable. Said terms have well known meanings in the wire and cable field.

2. Preparation Process of a Cable

The below defined preparation process of a cable is preferable for use in the crosslinking process of a cable of the invention as defined above and in below claims. Moreover said preparation process of a cable as such forms an independent invention.

A preferable embodiment of the process for preparing a cable of the invention comprises steps of applying, preferably by (co)extrusion, one or more layers on a conductor, which layers comprise a polymer composition, wherein at least one layer comprises said polymer composition of the invention.

The term "(co)extrusion" means herein that in case of two or more layers, said layers can be extruded in separate steps, or at least two or all of said layers can be coextruded in a same extrusion step, as well known in the art.

In said process of the invention the components of a layer material are mixed in a separate mixer before introducing to the extruder for producing said layers or are added directly to an extruder and mixed therein before forming to a layer. Additives and further components can be added during the mixing step. The mixture in extruder is subjected to an elevated temperature, typically above the melting point of the polymer components and then (co)extruded on a conductor in a manner very well known in the field. E.g. conventional extruders and mixers may be used in the process of the invention.

The above described polymer powder, polymer pellets or melt of the invention, which comprise said polymer composition of the invention comprising Compound of the invention, can each equally be used in said process for preparing cables and they can be prepared prior their use in the cable preparation step or they can be prepared directly in a cable production line during a cable manufacturing process, as described above e.g. under "II. Polymer composition". Accordingly, 1) preformed Powder or pellets of a polymer composition of the invention comprising Compound of the invention, may be subjected to the cable production line; or 2) said Compound of the invention may be added together with pellets or powder to a mixing step before forming the cable layer(s). Such mixing step can be a separate step in a separate mixing device arranged in the cable production line to precede the cable layer formation step, e.g. an extrusion step. Alternatively, Compound of the invention can be added during the layer formation step e.g. in an extruder, whereby it can be introduced to the extruder together with or after the addition of polymer powder or polymer pellets. The addition point in an extruder is not limited, whereby the Compound of the invention can be added at the inlet of the extruder or at a later feed point arranged along the extruder. Accordingly the addition of Compound of the invention may take place at the time the polymer material is in solid non-molten, partly molten or molten state, i.e. a melt mixture. The obtained molten mixture of a layer material is then (co)extruded on to a conductor to form a cable layer. In a preferred cable preparation process of the invention a low voltage cable or, more preferably, a power cable of the invention as defined above under 1.1. Cable is produced. The obtained cable can be further processed for the end use application.

Typically the cable of the invention is crosslinked after the formation of cable layers. The invention further provides a process for crosslinking a cable by radical reaction using one or more free radical generating agents, comprising step of: applying one or more layers comprising a polymer composition on a conductor, wherein at least one layer comprises one or more free radical generating agents, crosslinking by radical reaction said at least one layer comprising said free radical generating agent(s), and recovering the crosslinked cable in a conventional manner for further use; wherein in said process said crosslinking is effected by producing methane as a decomposition product of said crosslinking step in an amount of less than 300 ppm (weight), when determined according to a method described below under "GC-analysis protocol", preferably said crosslinking step is carried out without producing methane as a decomposition product of said crosslinking step.

A further independent crosslinking process for crosslinking a cable by radical reaction using one or more free radical generating agents, comprising step of: applying one or more layers comprising a polymer composition on a conductor, wherein at least one layer comprises one or more free radical generating agents, crosslinking by radical reaction said at least one layer comprising said free radical generating agent(s), and recovering the crosslinked cable in a conventional manner for further use; wherein said crosslinking is carried out in the presence of Compound of the invention as a free radical generating agent, preferably in the presence of a compound of formula (I) as defined above and below in claims. In another preferable embodiment this independent crosslinking process is dependent on the above crosslinking process wherein the features are defined by means of the decomposition products.

In above crosslinking processes of the invention crosslinking conditions can vary depending i.a. on the used materials and cable size. The crosslinking of the invention is effected e.g. in a known manner preferably in an elevated temperature. Preferably the lowest temperature in a cable layer during the crosslinking step is above 140° C., more preferably above 150° C., such as 160-210° C. The crosslinking may be carried out in a liquid or gas medium, such as in an inert gas, such as $N_2$, atmosphere. The pressure during the crosslinking step of the invention is typically up to 20 bar, preferably up to 13 bar, such as 10-15 bar, in inert atmosphere. Said crosslinking step of the invention is also described above under "1. Crosslinking of polymers" and above under "II. Polymer composition".

A further preferable embodiment of the crosslinking process of the invention comprises a further step of cooling the crosslinked cable preferably under pressurized conditions in a cooling medium e.g. in gas or liquid such as $N_2$, oil or water. The cooling is effected in a cooling zone, which may be optionally integrated with the preceding crosslinking zone, e.g. in a known vulcanization tube. As an example only, continuous catenary vulcanization (CCV) tube can be mentioned. The temperature at the layer closest to conductor is typically below 200° C., e.g. 160-190° C., at the beginning of the cooling zone/step. The pressure during the cooling step of the invention is typically kept above atmospheric pressure, e.g. up to 20 bar, preferably up to 13 bar, such as 10-12 bar. The cable is removed from the pressurized cooling step, when the temperature of the cable layers is clearly below the melting point of the polymer layer material thereof. Accordingly, the crosslinked cable of the invention may leave the pressurized cooling step of the invention, e.g. when the temperature of the conductor of said cable is below 110° C. depending on the layer polymer material, preferably between 70-90° C., at the exit of the pressurized cooling zone.

The crosslinking and cooling step is normally carried out under pressurized conditions to prevent the formation of voids due to volatile decomposition products of e.g. peroxides. The process of the invention thus enables to remove the crosslinked and cooled cable from the pressurized cooling zone in a temperature higher than in the prior art, when measured from the conductor.

Optionally, if desired, the crosslinked cable of the invention may be subjected to an additional non-pressurised cooling step after said pressurized cooling step, for further cooling of the cable.

In some embodiments the crosslinking and pressurized cooling step may be effected at lower pressures compared to prior art, e.g. at pressure below 10 or 12 bars, e.g. at 0-10 bar.

The cable preparation process of the invention optionally comprises a further recovering step of the cable coming from the cooling step. Recovering may be effected by winding the cable on a cable drum in a known manner.

In a further embodiment of the process of the invention the cable obtained from the cooling step and optionally recovered, e.g. wound to a cable drum, may optionally be subjected, if needed in some applications, to a subsequent degassing step i.a. for removing or reducing any volatile decomposition products possibly resulting from said crosslinking step of the invention. In said degassing step the cable of the invention is preferably exposed either in ambient or elevated temperature for a period of time. As an example only, said degassing temperature may be e.g. 50-80° C., for a time period of one to four weeks. In one embodiment of the crosslinking process said degassing step may be shortened considerably or even avoided due to decreased level of said volatile by-products.

The cable of the invention produced by the above process of the invention may be further processed, e.g. protected with a protective layer, and/or optionally covered by a jacketing layer in a subsequent finishing step in a known manner and recovered for the end use thereof.

The invention thus provides also a crosslinked cable comprising crosslinked polymer composition as defined above, preferably a crosslinked low voltage cable or power cable, more preferably a crosslinked power cable, as defined above. Preferably said crosslinked cable is obtainable by any of the crosslinking processes as defined above.

In one embodiment of a crosslinking process of the invention a crosslinked power cable is produced which is selected from a crosslinked MV cable, wherein the lowest degree of crosslinking in a cable layer(s) meets the requirements as specified in IEC 60502, or a crosslinked HV cable, wherein the lowest degree of crosslinking in a cable layer(s) meets the requirements as specified in IEC 60840, which specifications are well known in the W&C field.

The advantageous Compounds of the invention are preferable free radical generating agents which can be used for improving the quality of the products, e.g. in cable production processes. Due to the present invention the amount of voids in polymer products, such as cable layers can be reduced or even avoided, since less or no volatile decomposition products are formed from e.g. when Compound of the invention is used for modifying the polymer. Moreover, the invention also enables to improve the proccessability of a cable, i.a. in terms of safer and faster processing. E.g. the crosslinking process of the invention can be faster and/or more economical, since both cooling and/or degassing steps may be carried out in a reduced time and/or in a less energy consuming manner, if desired.

Determination Methods

Unless otherwise stated the below determination methods were used to determine the properties defined generally in the description part and claims and in the experimental part.

Melt Flow Rate

The melt flow rate (MFR) is determined according to ISO 1133 and is indicated in g/10 min. The MFR is an indication of the flowability, and hence the proccessability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

Density

The density was measured according to ISO 1183D. The sample preparation was executed according to ISO 1872-2.

Gel Content

The gel content was determined according to ASTM D 2765-01, method A using a crosslinked sample which consists of the polymer composition under test and prepared according to "Preparation of samples, crosslinking" below.

Gel content on a cable is carried out using ASTM D 2765-01 method B.

Methods A and B give comparable results.

GC-Analysis Protocol

In definitions of the Compounds, Polymer compositions, cables and preparation process and modification methods thereof as defined above and in claims below, the volatile, e.g. $CH_4$, content given in ppm (weight) or as "absent" is determined by gas chromatography (GC) from a sample which is modified, e.g. crosslinked.

The test is used to determine the produced volatiles, e.g. methane, content of a free radical generating agent. The test free radical generating agent is used in such an amount with which a crosslinking degree expressed as gel content of 50% was achieved, preferably gel content of at least 50%. Crosslinking conditions of the sample are not critical and may be effected e.g. as described below under "Preparation of samples, crosslinking"

Volatiles are measured by taking a sample specimen of 1 g with a thickness of 1.5 mm from a modified, e.g. crosslinked composition, e.g. a plaque or cable. In the case of a cable comprising a crosslinked layer(s), the sample specimen is taken from a layer material of a crosslinked and cooled cable sample that is taken at the exit of a crosslinking/cooling zone, such as at the exit of a vulcanisation tube, after pressurised cooling step in a manner known for a skilled person.

The collection of volatiles from said sample specimen (to a head space bottle, see below) is started within one hour after the modification step is stopped, or in case of a crosslinked and cooled cable, within one hour after the cable sample is taken at the exit of a crosslinking/cooling zone.

A sample specimen of a thickness of 1.5 mm and of a weight of 1 g is cut from the middle of a plaque which is 100 mm wide and 100 mm long. The obtained sample (specimen) is placed in a 120 ml head space bottle with an aluminium crimp cup with seal and heat treated at 60° C. for 1.5 h for collecting any gaseous volatiles present in said sample. Then 0.3-0.5 ml of the gas captured in the sample bottle is injected into a gas chromatograph, wherein the presence and content of the volatiles, e.g. methane, which are desired to be measured in a known manner. Double samples are analysed and a "zero-sample" without free radical generating agent/modification is used as a reference. The instrument used herein was a Varian 3400 with a $Al_2O_3/Na_2SO_4$-column of 0.53 mm×50 m, supplied by Chrompack.

Specimen from a Cable

A sample specimen of a thickness of 1.5 mm and of a weight of 1 g is cut in an axial direction from said cable sample from the middle distance (in radial direction) of the polymer layer(s) ring surrounding the conductor of said cable sample (i.e. at the distance of ½ radius of said cable layer ring). The collection and determination of volatiles was carried out as described above.

Specimen from a Plaque

The volatile, e.g. $CH_4$, content given in ppm (weight) or as "absent" is determined by gas chromatography (GC) from a sample plaque which is modified, e.g. crosslinked according to the protocol described in the section entitled "Preparation of samples, crosslinking" above. The test composition contains 2 parts test peroxide and 100 parts test polymer (i.e. sufficient to cause a degree of cross-linking of 50% or more).

A sample specimen of a thickness of 1.5 mm and of a weight of 1 g is cut from the middle of a plaque which is 100 mm wide and 100 mm long. The collection and determination of volatiles was carried out as described above.

Materials

In each test for references and for examples of this application the test arrangement for the reference polymer, i.e. the polymer without any added additive such as organic peroxide, and for the tested compositions, i.e. the reference polymer containing the organic peroxide, was the same.

The unsaturated polymer: The polymer is a poly (ethylene-co-1,7-octadiene)

Poly(ethylene-co-1,7-octadiene) manufacture

Ethylene was compressed in a 5-stage precompressor and a 2-stage hyper compressor with intermediate cooling to reach an initial reaction pressure of ca. 2950 bar. The total compressor throughput was ca. 30 tons/hour. In the compressor area approximately 120 kg propylene/hour was added as chain transfer agent to maintain an MFR of 3.2 g/10 min. Here also 1,7-octadiene was added to the reactor in amount of ca. 50 kg/h. The compressed mixture was heated to approximately 165° C. in a preheating section of a front feed three-zone tubular reactor with an inner diameter of ca. 40 mm and a total length of ca. 1200 meters. A mixture of commercially available peroxide radical initiators dissolved in isododecane was injected just after the preheater in an amount sufficient for the exothermal polymerization reaction to reach peak temperature of ca. 280° C. after which it was cooled to approx 250° C. The subsequent 2nd and 3rd peak reaction temperatures were ca. 280° C. and ca. 270° C., respectively, with a cooling in between down to approximately 250° C. The reaction mixture was depressurized by a kick valve, cooled and polymer was separated from unreacted gas.

The obtained polymer had a total number of C—C carbon double bonds of 1.286/1000 C and the number of vinyl groups was 0.994 vinyl groups/1000 C. The density of the material was 920 kg/m³ and MFR (2.16 kg)=3.2 g/10 min.

The above unsaturated polymer was used in testing the examples of the invention containing compounds (I) of the invention as the crosslinking agent, comparative examples with dicumylperoxide as the crosslinking agent and the reference example containing no crosslinking agent.

The commercial reference organic peroxide, dicumyl peroxide, was supplied by AkzoNobel.

Preparation of Samples, Impregnation

The test polyethylene pellets were ground to a fine powder in a Retsch grinder with a 1.5 mm sieve. The powder obtained was impregnated with the test peroxide dissolved in a pentane solution until the pentane had evaporated to give a dry powder of the test peroxide and the test polymer. The content of the test composition was 3 parts test peroxide and 100 parts test polymer when the gel content of the crosslinked test composition was tested as described below. The content of the test composition was 2 parts test peroxide and 100 parts test polymer when the volatiles content was determined as described in the GC-analysis protocol.

Preparation of Samples, Crosslinking

The test plaques had the following dimensions and crosslinking cycle. The plaques were 100 mm long, 100 mm wide, and 0.1 mm thick when used for determination of the gel content as described below, and 100 mm long, 100 mm wide, and 1.5 mm thick when the volatiles content was determined as described in the GC-analysis protocol below. The crosslinking was conducted in a Specac press, where the composition was kept at 120° C. for 1 min at 5 bar, then the temperature was increased with 60° C./min for 1 min to reach 180° C. at 5 bar, and kept at 180° C. at 5 bar for 12 min, followed by cooling to ambient temperature over 30 min at 5 bar.

Examples

Example 1

Preparation of Di-(1-methyl-1-phenylundecyl)peroxide ($R^1$, $R^{1'}$=phenyl; $R^2$, $R^{2'}$=methyl; $R^3$, $R^{3'}$=decyl)

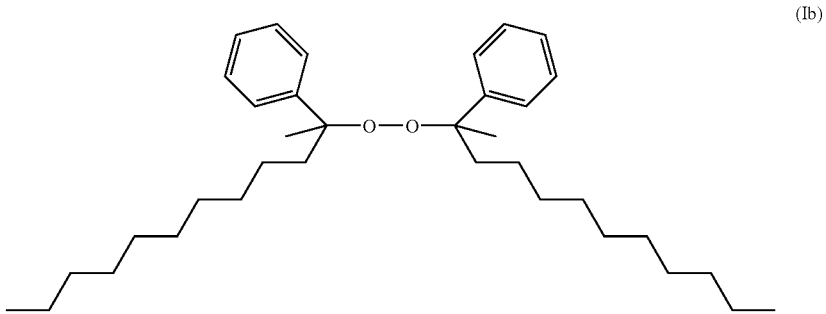 [SMILES: CCCCCCCCCCC(C)(OOC(C)(CCCCCCCCCC)c1ccccc1)c1ccccc1]

(Ib)

A. 1-methyl-1-phenylundecyl alcohol

To a suspension of 2.43 g (0.1 mol) magnesium turnings in 10 ml of diethyl ether was added 0.1 ml of 1,2-dibromoethane and the mixture was stirred. 22.17 g (0.1 mol) of 1-bromodecane in 20 ml diethyl ether was added dropwise and the mixture was refluxed for 15 minutes, then cooled. 9.61 g (0.08 mol) of acetophenone in 20 ml diethyl ether was added while cooling on ice bath. The ice bath was removed and the reaction mixture stirred at room temperature for 30 minutes. The mixture was then poured into a slurry of 30 g ammonium chloride in 150 ml water and 100 g ice while stirring vigorously. The mixture was filtered, the ether layer separated and the aqueous layer extracted twice with 50 ml of ether. The organic layers were combined, washed with water, 10% NaHSO₃, brine, dried and evaporated to give 22.48 g of clear oil. The oil was purified with dry column chromatography using pentane. The eluant was evaporated giving 17.22 g (82%) of 1-methyl-1-phenylundecyl alcohol as a viscous colorless oil.

B. 1-methyl-1-phenylundecyl hydroperoxide 10.50 g (0.04 mol) of 1-methyl-1-phenylundecyl alcohol was dissolved in 50 ml of dichloromethane, cooled in ice bath, 10.6 ml (12.29 g, 0.08 mol) of trimethylsilyl bromide was added and the mixture stirred for 1 h under protection from moisture. The solution was diluted with 100 ml ether and washed four times with 50 ml water, brine, dried and evaporated to give crude 2-phenyl-2-bromododecane. 35 ml of 2.3 M hydrogen peroxide in THF (0.08 mol) was added to the 2-phenyl-2-dodecyl bromide and the mixture was cooled on ice bath. 8.84 g (0.04 mol) of silver trifluoroacetate was added. 70 ml of conc. NaHCO₃ was added and the mixture filtered. The reaction flask and the filter cake was rinsed with diethyl ether. The aqueous phase was separated and the organic phase washed with conc. NaHCO₃, 50 ml water, brine, dried and evaporated to give an oil. The oil was purified by flash chromatography using 2:8 ether:pentane as eluent. The yield of 1-methyl-1-phenylundecyl hydroperoxide was 30%.

C. Di-(1-methyl-1-phenylundecyl)peroxide 0.942 g (3.6 mmol) of 1-methyl-1-phenylundecyl alcohol was dissolved in 5 ml of dichloromethane, 1 ml of trimethylsilyl bromide (7.2 mmol) was added and the mixture stirred for 1 h under protection from moisture. The solution was diluted with 15 ml of diethyl ether, washed with water (3×10 ml), 15 ml brine, dried and evaporated to give 1.18 of crude 2-phenyl-2-bromododecane. 795 mg of silver trifluoroacetate (3.6 mmol) was dissolved in 5 ml THF. To the crude bromide was added 500 mg of 1-methyl-1-phenylundecyl hydroperoxide (1.8 mmol) dissolved in 10 ml THF. This mixture was cooled in ice-salt bath to −15° C. and the silver trifluoroacetate solution added with a pipette. 2 ml of brine was then added, followed by 10 ml conc. NaHCO$_3$. The reaction mixture was stirred and filtered. The reaction flask and the filter cake were rinsed with 15 ml diethyl ether. The aqueous phase was separated and the organic phase washed with conc. NaHCO$_3$, 15 ml water, 15 ml brine, dried and evaporated to give 1.40 g of a yellowish oil. Purification was done using a 1:9 ether:pentane mixture as eluent. The yield was 409 mg (43%). $^{13}$C-NMR (CDCl$_3$) δ 14.33, 22.91, 23.96, 24.06, 24.19, 29.55, 29.72, 29.82, 30.24, 32.13, 40.68, 40.97, 84.18, 126.16, 126.69, 127.86, 145.59, 145.71

Example 2

Preparation of Di(1-methyl-cyclohexyl)peroxide ($R^1$=methyl; $R^2$+$R^3$ form together with $C^1$ a cyclohexyl ring and $R^{1'}$=methyl; $R^{2'}$+$R^{3'}$ form together with $C^{1'}$ a cyclohexyl ring)

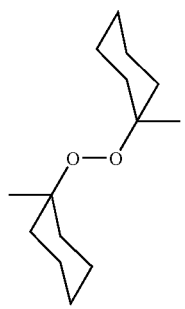

A. Di(1-methyl-cyclohexyl)peroxide 1-methylcyclohexanol (30 g, 0.26 mol) was placed in a 100 mL three necked round bottomed flask and was stirred. The flask was cooled in a brine/ice bath, dropping funnel fitted and fitted with a static N$_2$ supply. The dropping funnel was charged with 98% sulfuric acid (16.14 ml) and water (6.45 ml) giving a 70% sulfuric acid solution. This was added dropwise to the 1-methylcyclohexanol and stirring continued to give a viscous brown mixture. The bath was recharged with ice/brine, dropping funnel rinsed with water and recharged with 35% hydrogen peroxide (6.98 mL, 0.125 mol) and added dropwise. The solution separated into two phases. Cyclohexanol (150 mL) was added and the mixture was transferred to a separating funnel. The aqueous fraction was extracted with another portion of cyclohexane (150 ml) and the combined organic fractions washed with 1M NaOH (2×100 mL), water (2×150 mL), dried and evaporated to give a viscous colourless oil. (12.98 g). The oil was sorbed onto silica gel then placed on a silica gel column and eluted with cyclohexane. After evaporation at reduced pressure 0.7 g colourless oil of di(1-methyl-cyclohexyl)peroxide was obtained. $^{13}$C-NMR (CDCl$_3$) δ 22.45, 25.01, 25.95, 35.39, 78.58

Example 3

Preparation of Di(1-methyl-cyclopentyl)peroxide ($R^1$=methyl; $R^2$+$R^3$ form together with $C^1$ a cyclopentyl ring and $R^{1'}$=methyl; $R^{2'}$+$R^{3'}$ form together with $C^{1'}$ a cyclopentyl ring)

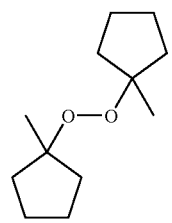

A. Di(1-methyl-cyclopentyl)peroxide

A 250 ml tri-neck round bottom flask was equipped and a 50 ml addition funnel and the flask was cooled <0 C. 30 g of 1-methylcyclopentanol (0.3 M, 1 EQ) was added to the flask. 70% H$_2$SO$_4$ solution was prepared and cooled in an ice bath. The H$_2$SO$_4$ (12.71 ml, 0.91 M, 3 EQ) was added drop wise over 15 minutes and the reaction mixture was stirred for ~2.5 hours in order to allow all the 1-methylcyclopentanol to dissolve. With the reaction stirring, 8.11 ml of H$_2$O$_2$ 35% (wt) (0.24 M, 0.8 EQ) was added drop wise over 15 minutes. The reaction was left stirring overnight. The reaction mixture was transferred to a separation funnel and extracted three times with 50 ml of pentane each time. Organic layers were collected and the aqueous was set aside. The organic layers were extracted 3 times with 50 ml of 1N NaOH each time to remove excess acid. The organic layer was collected, dried and concentrated. The residue was purified by chromatography on a silica column using pentane as the mobile phase. The product fractions were concentrated to yield 973 mg of di(1-methyl-cyclopentyl)peroxide as a colorless oil. $^{13}$C-NMR (CDCl$_3$) δ 24.43, 24.75, 37.13, 89.23

Gel Content

The gel content of the LDPE copolymer prepared as described above was determined according to the method above and the results are shown below (Table 1.)

TABLE 1

| Gel content | |
| --- | --- |
| Example | Gel content (%) |
| Reference polymer without peroxide | 0 |
| Ib | 51 |
| Ia | 62 |
| Ia' | 82 |

GC-Analysis

GC-analysis was performed to evaluate the amount of formed CH$_4$. The example is compared to a sample using dicumyl peroxide, which represent the conventional solution used today. The results are presented below (Table 2).

TABLE 2

GC-analysis of the CH₄ content.

| Example | CH₄ content (ppm) |
|---|---|
| Dicumyl peroxide | 719 (gel content 93%) |
| Ia' | <5* (gel content 84%)* |

*at values less than 5 ppm the amount of methane is so small that noise masks an accurate reading. Value less than 5 ppm are considered to represent non methane formed therefore.

Preparation of a Crosslinked Cable of the Invention:

A power cable comprising an inner semiconductive layer, an insulation layer and an outer semiconductive layer for experimental testing is prepared by coextruding on a conductor said layers in given order using a conventional extruder line and conventional extrusion conditions.

The layer materials are conventional polymer grades and each layer comprises a peroxide compound of the invention as a crosslinking agent.

The semiconductive material used in the cable, both as inner and outer semicon, is a poly(ethylene-co-butylacrylate) polymer (with a butylacrylate content of 17 wt %) containing 40 wt % of a furnace black. The composition is stabilised with an antioxidant of the polyquinoline type and contains 1 wt % of the peroxide of the invention as a crosslinking agent.

The middle insulation layer is formed of low density polyethylene LDPE ($MFR_2$=2 g/10 min) containing 2 wt-% of the peroxide of the invention and 0.2 wt-% of 4,4'-thiobis(2-tert.-butyl-5-methylphenol).

The obtained cable is immediately after extrusion subjected to a conventional vulcanisation tube and crosslinked in a known manner using well known crosslinking conditions. After crosslinking the cable is then cooled in cooling zone of said vulcanisation tube at a desired pressure and temperature. The cooling step is stopped when the desired temperature measured from the conductor is achieved. Typically the cooling step can be effected in a lower pressure and/or the cooling step can be stopped in a higher temperature at conductor compared to corresponding cable crosslinked to a same gel content, but using dicumylperoxide as the crosslinking agent. The crosslinked and cooled layer is wound to a cable drum and transferred to a degassing step to remove the volatile(s) content, if any. This step can typically be done in a lower temperature and/or a shorter period compared to corresponding cable crosslinked to a same gel content, but using dicumylperoxide as the crosslinking agent.

The invention claimed is:

1. A process for preparing a crosslinked cable, comprising the steps of:
    applying one or more layers comprising a polymer composition on a conductor, wherein at least one layer comprises one or more free radical generating agents,
    crosslinking by radical reaction said at least one layer comprising said free radical generating agent(s),
    cooling the obtained crosslinked cable under pressurized conditions to a cooled temperature, and
    recovering the crosslinked and cooled cable in a conventional manner for further use wherein said one or more free radical generating agents is a compound of formula (I)

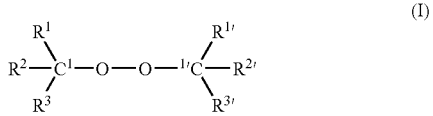

(I)

wherein
    $R^1$ and $R^{1'}$ are each independently H, substituted or unsubstituted saturated or partially unsaturated hydrocarbyl; or substituted or unsubstituted aromatic hydrocarbyl;
    wherein each of said substituted or unsubstituted saturated or partially unsaturated hydrocarbyl or aromatic hydrocarbyl optionally comprises one or more heteroatoms;
    and
    wherein said substituted saturated or partially unsaturated hydrocarbyl or substituted aromatic hydrocarbyl comprises independently 1 to 4 substituents selected from a functional group; saturated or partially unsaturated hydrocarbyl optionally bearing a functional group; or aromatic hydrocarbyl optionally bearing a functional group;
    $R^2$ and $R^3$ together with carbon atom ($C^1$) to which they are attached form an optionally substituted carbocyclic ring moiety of 3 to 12 ring C-atoms or an optionally substituted heteroring moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^2$ and $R^3$ together with carbon atom ($C^1$) form a (C3-C12) carbocyclic ring moiety,
    $R^{2'}$, and $R^{3'}$ are each independently H, substituted or unsubstituted saturated or partially unsaturated hydrocarbyl; or substituted or unsubstituted aromatic hydrocarbyl;
    wherein each of said substituted or unsubstituted saturated or partially unsaturated hydrocarbyl or aromatic hydrocarbyl optionally comprises one or more heteroatoms; and
    wherein said substituted saturated or partially unsaturated hydrocarbyl or substituted aromatic hydrocarbyl comprises independently 1 to 4 substituents selected from a functional group; a saturated or partially unsaturated hydrocarbyl optionally bearing a functional group; or an aromatic hydrocarbyl optionally bearing a functional group; or
    $R^{2'}$ and $R^{3'}$ together with the carbon atom ($C^{1'}$) to which they are attached form an unsubstituted or substituted saturated or partially unsaturated carbocyclic ring moiety of 3 to 14 C-atoms; unsubstituted or substituted saturated or partially unsaturated heteroring moiety of 3 to 14 ring atoms comprising 1 to 6 heteroatoms selected from O, N, P, S or Si; or unsubstituted or substituted aromatic ring moiety of 3 to 14 C-atoms optionally comprising 1 to 4 heteroatoms;
    wherein said carbocyclic ring, heteroring or aromatic ring system is optionally fused with another ring system having 4 to 14 ring atoms; and
    wherein said substituted carbocyclic ring, heteroring or aromatic ring system comprises 1 to 4 substituents selected independently from a functional group, a saturated or partially unsaturated hydrocarbyl optionally bearing a functional group; or an aromatic hydrocarbyl optionally bearing a functional group;
or functional derivatives thereof.

2. A process as claimed in claim 1 for preparing a crosslinked cable,
    characterized in that said process comprises one or two of the following features (i) and (ii):
    (i) said crosslinked and cooled cable is removed from the pressurized cooling step at a cooled temperature which is higher than the cooled temperature required for a reference cable which is a crosslinked cable having the same structure and layer material in each of said one or more layers, and prepared using the same process and conditions, and the same degree of crosslinking, as the claimed cable, but using a dicumyl peroxide as the free radical generating agent,
    in order for said reference cable to obtain the same level of voids at the exit of the pressurized cooling step as said claimed cable, which voids are formed by volatile decomposition products of said crosslinking step, or (ii) said crosslinking and pressurized cooling step is carried out in a lower pressure than the pressure required for a reference cable which is a crosslinked cable having the same structure and layer material in each of said one or more layers, and prepared using the same process and conditions, and the same degree of crosslinking, as the claimed cable, but using a dicumyl peroxide as the free radical generating agent, in order for said reference cable to obtain the same level of voids at the exit of the pressurized cooling step as said claimed cable, which voids are formed by volatile decomposition products of said crosslinking step.

3. A process for preparing a crosslinked cable as claimed in claim 1,
characterized in that said crosslinking is effected without $CH_4$ as a decomposition product thereof.

4. A process as claimed in claim 1, wherein in said compound of formula (I) $R^{2'}$ and $R^{3'}$ together with carbon atom ($C^{1'}$) to which they are attached form an optionally substituted carbocyclic ring moiety of 3 to 12 ring C-atoms or an optionally substituted heteroring moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^{2'}$ and $R^{3'}$ together with carbon atom ($C^{1'}$) form a (C3-C12) carbocyclic ring moiety.

5. A process as claimed in claim 1, wherein in said compound of formula (I) the ring system formed by $R^{2'}$ and $R^{3'}$ together with the carbon atom ($C^{1'}$) to which they are attached is same as the ring system formed by $R^2$ and $R^3$ together with the carbon atom ($C^1$) to which they are attached; and
wherein $R^1$ and $R^{1'}$ each represents optionally substituted branched or straight chain, preferably unsubstituted straight chain, (C6-C30)alkyl or methyl, preferably wherein $R^1$ and $R^{1'}$ are identical.

6. A process as claimed in claim 1, wherein in said compound of formula (I) $R^2$ and $R^3$ together with carbon atom ($C^1$) to which they are attached form an optionally substituted carbocyclic ring moiety of 3 to 12 ring C-atoms which is optionally fused with another ring system having 4 to 14 ring atoms, and
wherein $R^{2'}$ and $R^{3'}$ together with carbon atom ($C^{1'}$) to which they are attached form an optionally substituted carbocyclic ring moiety of 3 to 12 ring C-atoms which is optionally fused with another ring system having 4 to 14 ring atoms, and
wherein the ring system formed by $R^{2'}$ and $R^{3'}$ together with the carbon atom ($C^{1'}$) to which they are attached is the same as the ring system formed by $R^2$ and $R^3$ together with the carbon atom ($C^1$) to which they are attached; and
wherein $R^1$ and $R^{1'}$ each represents optionally substituted branched or straight chain, preferably unsubstituted straight chain, (C6-C30)alkyl or methyl.

7. A process as claimed in claim 1, wherein in said compound of formula (I) $R^1$ and $R^{1'}$ are same or different, preferably same, and each represents optionally substituted branched or straight chain, preferably unsubstituted straight chain, (C2-C30)alkyl, which is preferably (C6-C30)alkyl; or methyl, more preferably methyl; and
$R^2$ and $R^3$ together with $C^1$ atom to which they are attached form an optionally substituted, saturated or partially unsaturated mono- or bicyclic (C4-C12)carbocyclic ring, preferably unsubstituted saturated monocyclic (C5-C8)carbocyclic ring;
and $R^{2'}$ and $R^{3'}$ together with the carbon atom ($C^{1'}$) to which they are attached form an optionally substituted, saturated or partially unsaturated mono- or bicyclic (C4-C14)carbocyclic ring, preferably unsubstituted saturated monocyclic (C5-C8)carbocyclic ring; whereby the ring system formed by $R^2$ and $R^3$ together with $C^1$ is preferably identical to a ring system formed by $R^{2'}$ and $R^{3'}$ together with $C^{1'}$.

8. A process as claimed in claim 1, wherein in said compound of formula (I) $R^1$, and $R^{1'}$ and each independently is optionally substituted mono- or multicyclic (C5-C14)aryl; optionally substituted mono- or multicyclic (C5-C14)heteroaryl; optionally substituted mono- or multicyclic (C4-C14)cycloalkyl; optionally substituted mono- or multicyclic (C4-C14)heterocyclyl; optionally substituted straight or branched chain (C1-C50)alkyl, preferably optionally substituted straight chain (C1-C30)alkyl; optionally substituted straight or branched chain (C1-C50)alkenyl or optionally substituted straight or branched chain (C1-C50)alkynyl, preferably straight chain (C1-C30)alkenyl or straight chain (C1-C30)alkynyl; optionally substituted straight or branched chain (C1-C50)heteroalkyl comprising 1 to 4 heteroatoms selected from O, N, P, S or Si.

9. A process as claimed in claim 1, wherein in said compound of formula (I) $R^2$ and $R^{2'}$ are the same radical and, $R^3$ and $R^{3'}$ are the same radical.

10. A process as claimed in claim 1, wherein in said compound of formula (I),
$R^1$ and $R^{1'}$ are same or different, preferably same, and each represents optionally substituted, saturated or partially unsaturated cyclic hydrocarbyl of 5 to 14 ring atoms optionally containing 1 to 4 heteroring atoms selected from N, O, P, S or Si; or optionally substituted mono- or multicyclic (C5-C14)aryl, preferably unsubstituted monocyclic (C5-C7)aryl; or
$R^1$ and $R^{1'}$ are same or different, preferably same, and each represents optionally substituted branched or straight chain, preferably unsubstituted straight chain, (C6-C30) alkyl or methyl.

11. A process as claimed in claim 1 wherein in said compound of formula (I) $R^1$ and $R^{1'}$ are same and each represents methyl; and
$R^2$ and $R^3$ together with $C^1$ atom to which they are attached form an optionally substituted, saturated or partially unsaturated mono- or bicyclic (C4-C12)carbocyclic ring, preferably unsubstituted saturated monocyclic (C5-C8)carbocyclic ring;
and $R^{2'}$ and $R^{3'}$ together with the carbon atom ($C^{1'}$) to which they are attached form an optionally substituted, saturated or partially unsaturated mono- or bicyclic (C4-C12)carbocyclic ring, preferably unsubstituted saturated monocyclic (C5-C8)carbocyclic ring; whereby the ring system formed by $R^2$ and $R^3$ together with $C^1$ is preferably identical to a ring system formed by $R^{2'}$ and $R^{3'}$ together with $C^{1'}$.

12. A process as claimed in claim 11 wherein said compound is of formula (II)

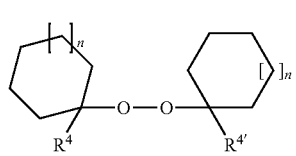

wherein n is 0 to 3, and $R^4$ and $R^{4'}$ each independently represent a straight chain alkyl group having 1 to 30 carbon atoms, preferably methyl or straight chain alkyl group having 6 to 20, preferably 6 to 12, carbon atoms, more preferably methyl, and wherein one or both ring systems independently are unsubstituted or optionally substituted by 1 to 4 substituents.

13. A process as claimed in claim 1, wherein in said compound of formula (I) said optional substitutents are each independently selected from —OH, —NR$_2$, wherein each R is independently H or (C1-C12)alkyl, COR", wherein R" is i.a. H, (C1-C12)alkyl or —NR₂, wherein each R is as defined for —NR₂, COOR", wherein R is as defined for —COR"; halogen, such as —F, —Cl or —I; or alkoxy, saturated or partially unsaturated hydrocarbyl optionally bearing a functional group; or aromatic hydrocarbyl optionally bearing a functional group.

14. A process as claimed in claim 1, wherein in said compound of formula (I) is of formula (V)

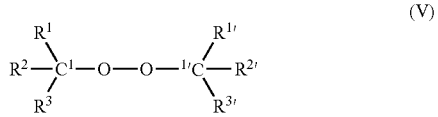

wherein the compounds are selected from any of the alternatives (i) to (iii):
(i) $R^1$ and $R^{1'}$ are each independently H, substituted or unsubstituted saturated or partially unsaturated hydrocarbyl;
  wherein each of said substituted or unsubstituted saturated or partially unsaturated hydrocarbyl optionally comprises one or more heteroatoms;
  wherein said substituted or unsubstituted saturated or partially unsaturated hydrocarbyl include (i) straight or branched chain saturated or partially unsaturated hydrocarbyls, (ii) straight or branched chain saturated or partially unsaturated hydrocarbyls which bear saturated or partially unsaturated cyclic hydrocarbyl and (iii) saturated or partially unsaturated cyclic hydrocarbyls;
  wherein each of said saturated or partially unsaturated cyclic hydrocarbyl is independently a monocyclic or multicyclic ring system; and
  wherein said substituted saturated or partially unsaturated hydrocarbyl comprise independently 1 to 4 substituents selected from a functional group, a saturated or partially unsaturated hydrocarbyl optionally bearing a functional group or aromatic hydrocarbyl optionally bearing a functional group; and
$R^2$ and $R^3$ together with carbon atom ($C^1$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^2$ and $R^3$ together with carbon atom ($C^1$) form a ($C_3$-$C_{12}$) carbocyclic ring moiety;
$R^{2'}$ and $R^{3'}$ together with carbon atom ($C^{1'}$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^{2'}$ and $R^{3'}$ together with carbon atom ($C^{1'}$) form a (C3-C12) carbocyclic ring moiety.

15. A process as claimed in claim 1, wherein the compound of formula (I) is selected from any of
Di(1-methylcyclopentyl)peroxide
or
Di(1-methyl-cyclohexyl)peroxide.

16. A process as defined in claim 1, wherein the crosslinked and cooled cable is removed from said pressurized cooling step at a cooled temperature of 2° C. or more higher than the cooled temperature of said crosslinked reference cable as defined in claim 1, more preferably at a cooled temperature of 5° C. or more higher than the cooled temperature of said crosslinked reference cable as defined in claim 1, when measured from a conductor of a crosslinked cable at the exit of the pressurized cooling step.

17. The process of claim 1, wherein the crosslinked and cooled cable is further subjected to one or more optional steps selected from:
  a non-pressurized cooling step, wherein the crosslinked and cooled cable is further cooled in a cooling medium,
  a recovering step, wherein the crosslinked cable is collected after the cooling step, preferably wound to a cable drum,
  a degassing step, wherein the content of volatile decomposition products(s) is reduced or removed, optionally at ambient or in elevated temperature, from the crosslinked cable obtained from cooling and optional recovery step, and/or
  a finishing step, wherein the obtained crosslinked cable is finished in a conventional manner for further use.

18. The process as defined in claim 1, for preparing a crosslinked cable which comprises at least an insulation layer, wherein said at least insulation layer is crosslinked in the presence of said free radical generating agent.

19. The process as defined in claim 1 for preparing a crosslinked cable which comprises at least one semiconductive layer, wherein said at least one semiconductive layer is crosslinked in the presence of said free radical generating agent.

20. The process as defined in claim 1 for preparing a crosslinked cable which comprises a jacketing layer and optionally one or more layers selected from an insulation layer and semiconductive layer surrounded by said jacketing layer, wherein at least said jacketing layer is crosslinked in the presence of said free radical generating agent.

21. The process as defined in claim 1 for preparing a crosslinked cable which is selected from any of the following cables:
  a low voltage cable comprising a conductor surrounded by an insulation layer and optionally a jacketing layer, wherein said insulation layer is crosslinked in the presence of said free radical generating agent; or
  a power cable comprising an electrical conductor surrounded by one or more layers comprising at least an inner semiconductive layer, insulation layer and an outer semiconductive layer, in that order, and optionally surrounded by a jacketing layer, wherein at least one of said layers, preferably at least inner semiconductive layer and insulation layer, is crosslinked in the presence of said free radical generating agent.

22. A process for preparing a crosslinked cable, comprising the steps of:
  (i) applying one or more layers comprising a polymer composition on a conductor, wherein at least one layer comprises one or more free radical generating agents,
  (ii) crosslinking by radical reaction said at least one layer comprising said free radical generating agent(s), preferably under ambient pressure,
  (iii) cooling the obtained crosslinked cable, preferably under ambient pressure, and
  (iv) reducing or removing the content of volatile decomposition products(s), at ambient or in elevated temperature, from said crosslinked cable obtained from said cooling step; wherein said one or more free radical generating agents is a compound of formula (I)

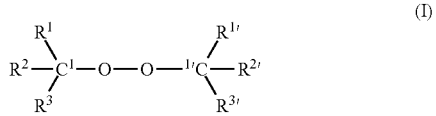
(I)

wherein
$R^1$ and $R^{1'}$ are each independently H, substituted or unsubstituted saturated or partially unsaturated hydrocarbyl; or substituted or unsubstituted aromatic hydrocarbyl;
wherein each of said substituted or unsubstituted saturated or partially unsaturated hydrocarbyl or aromatic hydrocarbyl optionally comprises one or more heteroatoms;
and
wherein said substituted saturated or partially unsaturated hydrocarbyl or substituted aromatic hydrocarbyl comprises independently 1 to 4 substituents selected from a functional group; saturated or partially unsaturated hydrocarbyl optionally bearing a functional group; or aromatic hydrocarbyl optionally bearing a functional group;
$R^2$ and $R^3$ together with carbon atom ($C^1$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^2$ and $R^3$ together with carbon atom ($C^1$) form a (C3-C12) carbocyclic ring moiety;
$R^{2'}$ and $R^{3'}$ together with carbon atom ($C^{1'}$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^{2'}$ and $R^{3'}$ together with carbon atom ($C^{1'}$) form a (C3-C12) carbocyclic ring moiety;
or functional derivatives thereof.

23. A process for preparing a crosslinked cable, comprising the steps of:
(i) applying one or more layers comprising a polymer composition on a conductor, wherein at least one layer comprises one or more free radical generating agents,
(ii) crosslinking by radical reaction said at least one layer comprising said free radical generating agent(s), preferably under ambient pressure,
(iii) cooling the obtained crosslinked cable, preferably under ambient pressure, and
(iv) using the product of step (iii) as a cable (i.e, no degassing step takes place);

wherein said one or more free radical generating agents is a compound of formula (I)

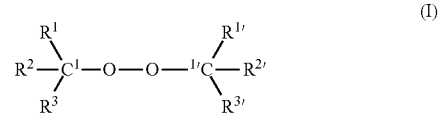
(I)

wherein
$R^1$ and $R^{1'}$ are each independently H, substituted or unsubstituted saturated or partially unsaturated hydrocarbyl; or substituted or unsubstituted aromatic hydrocarbyl;
wherein each of said substituted or unsubstituted saturated or partially unsaturated hydrocarbyl or aromatic hydrocarbyl optionally comprises one or more heteroatoms;
and
wherein said substituted saturated or partially unsaturated hydrocarbyl or substituted aromatic hydrocarbyl comprises independently 1 to 4 substituents selected from a functional group; saturated or partially unsaturated hydrocarbyl optionally bearing a functional group; or aromatic hydrocarbyl optionally bearing a functional group;
$R^2$ and $R^3$ together with carbon atom ($C^1$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^2$ and $R^3$ together with carbon atom ($C^1$) form a (C3-C12) carbocyclic ring moiety;
$R^{2'}$ and $R^{3'}$ together with carbon atom ($C^{1'}$) to which they are attached form an optionally substituted carbocyclic ring moiety of 3 to 12 ring C-atoms or an optionally substituted heterocyclic moiety of 3 to 12 ring atoms containing 1 to 6, preferably 1 to 4, heteroatoms selected from O, N, P, S or Si, and wherein said carbocyclic or heterocyclic ring system is optionally fused with another ring system having 4 to 14 ring atoms, preferably $R^{2'}$ and $R^{3'}$ together with carbon atom ($C^{1'}$) form a (C3-C12) carbocyclic ring moiety;
or functional derivatives thereof.

24. A as claimed in claim 1, wherein said compound of formula (I) $R^2$ and $R^3$ together with carbon atom ($C^1$) to which they are attached and/or wherein $R^{2'}$ and $R^{3'}$ together with carbon atom ($C^{1'}$) to which they are attached form an optionally substituted, saturated or partially unsaturated mono- or bicyclic (C4-C12) carbocyclic ring, more preferably an optionally substituted, saturated monocyclic (C5-C8) carbocyclic ring.

* * * * *